US011047679B2

(12) United States Patent
Mori et al.

(10) Patent No.: US 11,047,679 B2
(45) Date of Patent: Jun. 29, 2021

(54) ANGLE DETECTING APPARATUS

(71) Applicants: Tatsuya Mori, Chiyoda-ku (JP);
Tetsuya Kojima, Chiyoda-ku (JP);
Yoshihiko Kinpara, Chiyoda-ku (JP);
Takayuki Kifuku, Chiyoda-ku (JP)

(72) Inventors: Tatsuya Mori, Chiyoda-ku (JP);
Tetsuya Kojima, Chiyoda-ku (JP);
Yoshihiko Kinpara, Chiyoda-ku (JP);
Takayuki Kifuku, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1118 days.

(21) Appl. No.: 14/360,050

(22) PCT Filed: Dec. 12, 2012

(86) PCT No.: PCT/JP2012/082148
§ 371 (c)(1),
(2) Date: May 22, 2014

(87) PCT Pub. No.: WO2013/136612
PCT Pub. Date: Sep. 19, 2013

(65) Prior Publication Data
US 2014/0316733 A1    Oct. 23, 2014

(30) Foreign Application Priority Data

Mar. 16, 2012    (JP) .............................. JP2012-059731

(51) Int. Cl.
*G01B 21/22*    (2006.01)
*G01D 5/20*    (2006.01)
(Continued)

(52) U.S. Cl.
CPC ............... *G01B 21/22* (2013.01); *G01D 5/00* (2013.01); *G01D 5/2053* (2013.01); *G01D 5/2448* (2013.01); *G01D 3/02* (2013.01)

(58) Field of Classification Search
CPC ........ G01D 5/2053; G01D 5/00; G01D 5/142; G01D 5/3473; G01D 5/2448; G01D 5/145; G01D 3/02; G01B 21/22
See application file for complete search history.

(56) References Cited

U.S. PATENT DOCUMENTS 5,179,515 A * 1/1993 Lunz .................... G21C 17/108
376/254
6,320,344 B1 11/2001 Sakamoto et al.
(Continued)

FOREIGN PATENT DOCUMENTS

DE    102004038621 B3    2/2006
EP         0935335 A1    8/1999
(Continued)

OTHER PUBLICATIONS

International Search Report of PCT/JP2012/082148 dated Mar. 19, 2013.
(Continued)

*Primary Examiner* — Mischita L Henson
(74) *Attorney, Agent, or Firm* — Sughrue Mion, PLLC; Richard C. Turner

(57) ABSTRACT

An angle detecting apparatus is obtained. The angle detecting apparatus is capable of correcting an electrical angle frequency component of an angle signal contained angle signal. An angle detecting apparatus computes an angle signal of a rotary machine from a sine signal and a cosine signal obtained from the angle signal. Offset correction values for the sine signal and the cosine signal are computed from the angle signal. The computed offset correction value for the sine signal is added to the sine signal to correct the (Continued)

sine signal, and the computed offset correction value for the cosine signal is added to the cosine signal to correct the cosine signal.

15 Claims, 14 Drawing Sheets

(51) Int. Cl.
    *G01D 5/244*     (2006.01)
    *G01D 5/00*     (2006.01)
    *G01D 3/02*     (2006.01)

(56) References Cited

U.S. PATENT DOCUMENTS

| | | | |
|---|---|---|---|
| 2005/0067996 A1* | 3/2005 | Eba | G05B 19/19 |
| | | | 318/609 |
| 2006/0077083 A1 | 4/2006 | Kiriyama et al. | |
| 2006/0273247 A1 | 12/2006 | Sakamaki et al. | |
| 2007/0288187 A1 | 12/2007 | Finkler et al. | |
| 2009/0039808 A1* | 2/2009 | Hashimoto | F04B 35/04 |
| | | | 318/400.02 |
| 2009/0167296 A1 | 7/2009 | Yokokawa | |
| 2010/0091926 A1 | 4/2010 | Kishibe et al. | |
| 2010/0102765 A1* | 4/2010 | Wilkens | H02P 6/16 |
| | | | 318/400.04 |
| 2010/0207615 A1* | 8/2010 | Dietmar | G01D 5/2073 |
| | | | 324/207.25 |
| 2012/0010849 A1* | 1/2012 | Yamada | G01D 5/2073 |
| | | | 702/151 |
| 2012/0187939 A1* | 7/2012 | Shinohara | G01R 33/072 |
| | | | 324/207.2 |
| 2012/0256773 A1* | 10/2012 | Takahashi | G01D 5/2046 |
| | | | 341/118 |

FOREIGN PATENT DOCUMENTS

| | | |
|---|---|---|
| EP | 1 647 811 A1 | 4/2006 |
| EP | 1 728 705 A2 | 12/2006 |
| JP | 11-027973 A | 1/1999 |
| JP | 2006-266758 A | 10/2006 |
| JP | 2008-273478 A | 11/2008 |
| JP | 2009-156852 A | 7/2009 |
| JP | 2010-071783 A | 4/2010 |
| JP | 2010-078461 A | 4/2010 |

OTHER PUBLICATIONS

Communication dated Sep. 17, 2015, issued by the European Patent Office in corresponding European Application No. 12871535.6.
Communication dated Nov. 4, 2015 from the State Intellectual Property Office of the People's Republic of China in counterpart application No. 201280071479.7.
Communication dated Jan. 13, 2015 from the Japanese Patent Office in counterpart Japanese Patent Application No. 2014504634.
Communication dated Jul. 21, 2016 from the European Patent Office in counterpart application No. 12871535.6.

\* cited by examiner

ANGLE DETECTING APPARATUS

CROSS REFERENCE TO RELATED APPLICATIONS

This is a National Stage of International Application No. PCT/JP2012/082148 filed Dec. 12, 2012, claiming priority based on Japanese Patent Application No. 2012-059731 filed Mar. 16, 2012, the contents of all of which are incorporated herein by reference in their entirety.

TECHNICAL FIELD

This invention relates to an angle detecting apparatus.

BACKGROUND ART

A resolver is mechanically robust and excellent, in environmental resistance. For this reason, the resolver is widely used for detecting the rotation angle of a rotary machine. However, the resolver usually has errors resulting from decentering of a rotor and errors resulting from temperature drift of a differential amplifier, or the like and these errors appear as errors in the calculated angle. In view of this, according to PTL 1, midpoint correction values for a sine signal and a cosine signal of a resolver are stored in advance in an EEPROM (Electrically Erasable Programmable Read-Only Memory) or the like. Alternatively, according to PTL 1, the peak values and the bottom values of a sine signal, and a cosine signal are read, and a midpoint correction value is obtained from the difference between a predetermined midpoint value and midpoint between the peak value and the bottom value. The midpoint, correction value is added to the sine signal and the cosine signal to perform correction, and the angle of a rotary machine is calculated from the corrected sine signal and cosine signal.

In PTL 2, an angle signal is detected from the signals detected in a resolver, and from the detected angle signal, a velocity signal is detected. By making use of the fact that the error waveform of a resolver is composed of n-th order component inherent, to the resolver and that it is reproducible, an angle error estimator calculates the size of the error for each of a plurality of divided components by frequency converting, for example, Fourier transforming a high-frequency component of a velocity signal containing an error, which is generated from the detected angle signal containing an error. The calculated errors are synthesized to generate an error waveform signal in which the detected errors are recovered. With the use of this error waveform signal, an angle signal correcting circuit corrects the angle signal containing an error that has been detected by the resolver.

CITATION LIST

Patent Literature
  PTL 1: JP-A-2008-273478
  PTL 2: JP-A-2009-156852

SUMMARY OF INVENTION

Technical Problem

Among the angle errors for the angle signal of the rotation angle of a rotary machine detected by the resolver, which are due to the midpoint error caused by correcting a midpoint error (offset) the conventional angle detecting apparatus as disclosed in PTL 1 can correct an electrical angle frequency component of the angle signal. (Hereinafter, the electrical angle frequency of an angle signal is abbreviated as "1f", and the electrical angle frequency component of the angle signal is referred to as "1f angle error".) However, it cannot correct the 1f angle error resulting from the sine signal and the cosine signal containing the frequency component that is two times the 1f angle error.

Moreover, in the conventional angle detecting apparatus disclosed in PTL 2, the error waveform signal calculated in the angle error estimator is alternating quantity. Therefore, as the rotary machine rotates at a higher speed, the frequency of the error waveform signal becomes higher, so if there is a wasteful time in the calculation at the angle error estimator a phase shift occurs in the error waveform signal, and the error cannot be corrected accurately. Accordingly, the computing speed of the angle error estimator needs to be shortened, and the process load for the microcomputer increases.

This invention has been accomplished in order to solve the problems as described above, and it is an object of the invention to obtain an angle detecting apparatus that is capable of correcting 1f angle errors contained in the angle signal even when the sine signal and the cosine signal contain the frequency components that are twice the standard wave components thereof.

Solution to Problem

An angle detecting apparatus according to this invention is for computing an angle signal of a rotary machine from a sine signal and a cosine signal obtained from an angle detector, and the angle detecting apparatus is configured to compute respective offset correction values for the sine signal and the cosine signal from the angle signal, to add the computed sine signal offset correction value to the sine signal to correct the sine signal, and to add the computed cosine signal offset correction value to the cosine signal to correct the cosine signal.

In addition, the angle detecting apparatus according to this invention is configured to: by using an angle error $\Delta\theta$ obtained by removing, from the angle signal, a frequency component lower than the frequency of an electrical angle frequency component and extracting a frequency component equal to or higher than the frequency of the electrical angle frequency component, obtain the sine signal offset correction value from a cosine component of an inverted value $-\Delta\theta$ of the angle error $\Delta\theta$ and add the sine signal offset correction value to the sine signal, and is configured to obtain the cosine signal offset correction value from a sine component of the angle error $\Delta\theta$ and add the cosine signal offset correction value to the cosine signal, whereby the sine signal and the cosine signal are corrected.

Advantageous Effects of Invention with the angle detecting apparatus of this invention, the offset correction values for the sine signal and the cosine signal are computed from the angle signal to correct the sine signal and the cosine signal. Therefore, it becomes possible to correct the 1f angle error the electrical angle frequency component of the angle signal) even in the case where the sine signal and the cosine signal contain the frequency components that are two times the standard wave components thereof, in addition to the case where the midpoint errors of the sine signal and the cosine signal exist. Moreover, because the offset correction values are direct current quantities, the correction value computation is made possible at a low control response even in the case where the rotary machine rotates at high speed, noise resistance is improved, and it is made possible to use a central processing unit (CPU) with a low computing speed.

The foregoing and other object, features, aspects, and advantages of the present invention will become more apparent from the following detailed description of the present invention, when taken in conjunction with the accompanying drawings.

DESCRIPTION OF EMBODIMENTS

First Preferred Embodiment

Figure 1:
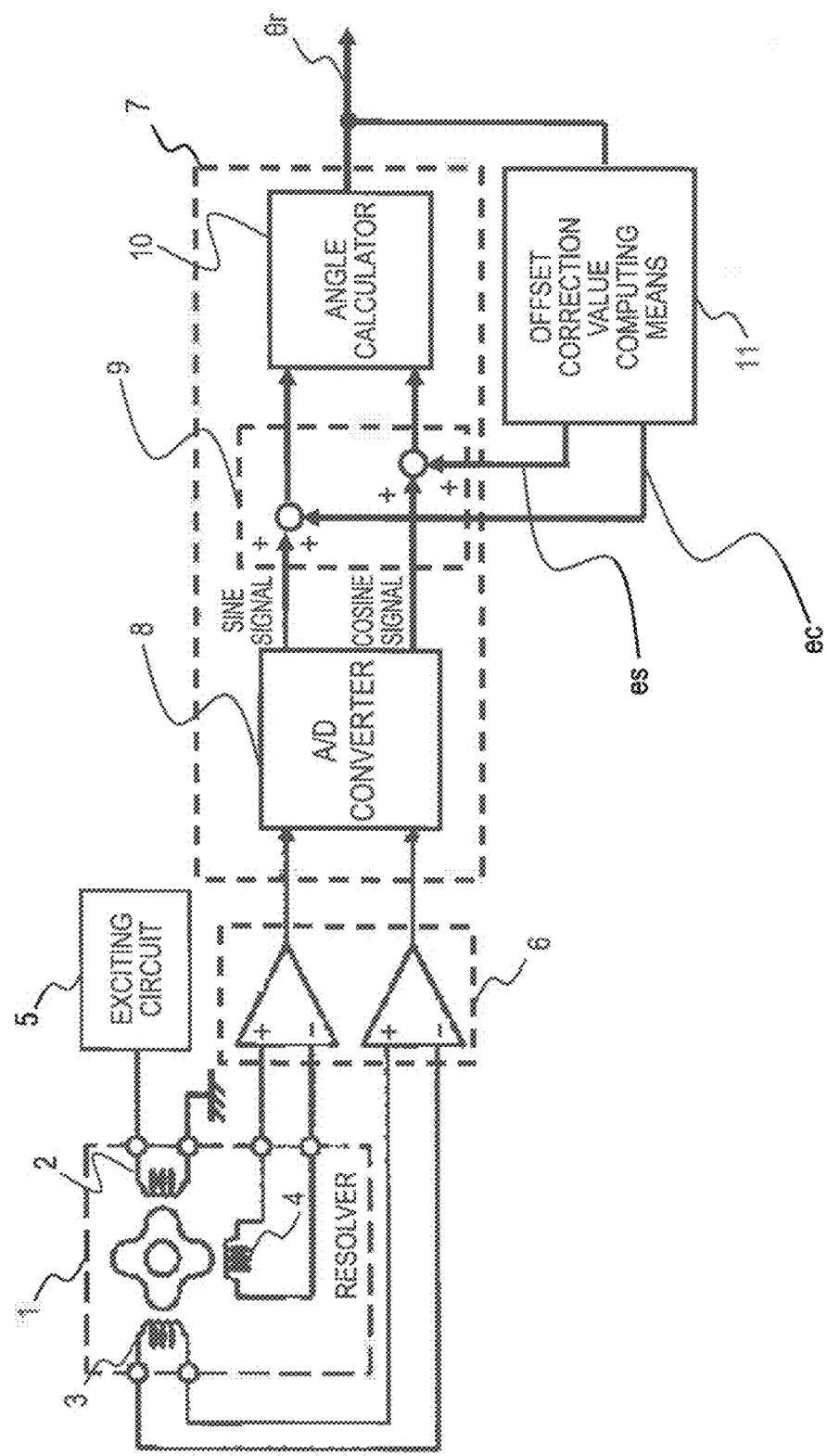
FIG. 1 is a block diagram showing the structure of an angle detecting apparatus according to a first preferred embodiment of this invention.
Figure 2:
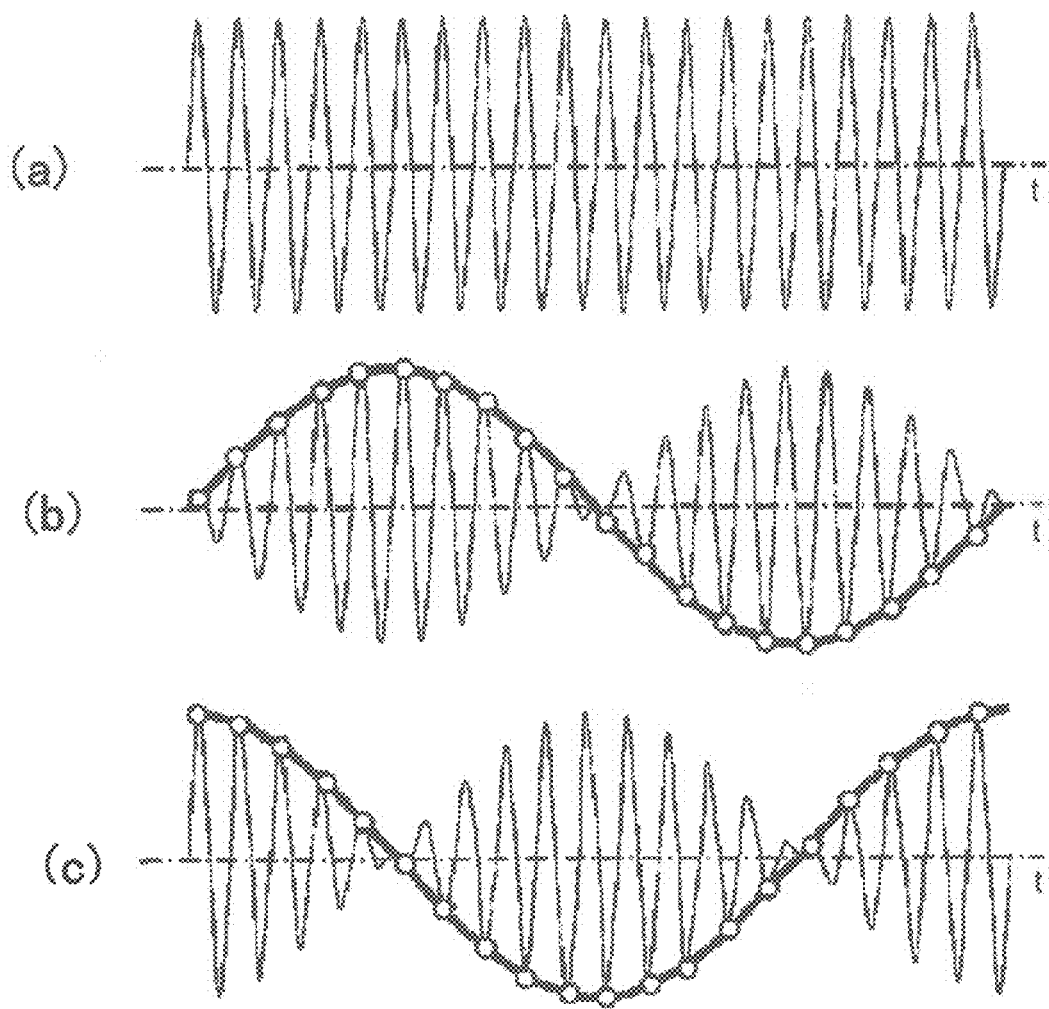
FIG. 2 is a waveform chart showing respective signal waveforms of the coils in the resolver of FIG. 1.

FIG. 1 is a block diagram showing the structure of an angle detecting apparatus according to a first preferred embodiment of this invention. Referring to the figure, resolver 1 includes a exciting coil 2, a sine detection coil 3 for detecting the sine of the angle of a rotary machine, and a cosine detection coil 4 for detecting the cosine of the angle of the rotary machine. By driving the exciting coil 2 with an alternating current signal shown in FIG. 2(a) a signal shown in FIG. 2(b), which is amplitude-modulated by the sine of the angle of the votary machine, is output to the output terminal of the sine detection coil 3, and a signal shown in FIG. 2(c), which is amplitude-modulated by the cosine of the angle of the rotary machine, is output to the output terminal of the cosine detection coil 4. Here, the horizontal axis in each of FIGS. 2(a), 2(b), and 2(c) represents time axis (time t), which shows one cycle period of the angle of the resolver. The vertical axis represents the amplitude of each of the signals.

Next, a processing method for the signals output from the resolver 1 will be described. Referring to FIG. 1, the exciting coil 2 of the resolver 1 is driven by an exciting circuit 5 with the alternating current signal shown in FIG. 2(a). The voltage between both output terminals of the sine detection coil 3 and the voltage between both output terminals of the cosine detection coil 4 in the resolver 1 are differentially amplified by a differential amplifier 6 and output to an angle calculating means 7. The angle calculating means 7 converts the peak points of the sine value and the cosine value indicated by the circles in FIGS. 2(b) and 2(c), in other words, the peak points of the sine value and the cosine value detected by the differential amplifier 6, from analog to digital by an A/D converter 8 and from the signal strings connecting these peak points, it obtains the sine signal and the cosine signal indicated by the bold lines in FIGS. 2(b) and 2 (The sine signal and the cosine signal, which are the outputs from the A/D converter 8, as well as a sine signal offset correction value $e_s$ and a cosine signal offset correction value $e_c$, are input to an adder 9. The adder 9 adds the sine signal and the sine signal offset correction value $e_s$, and adds the cosine signal and the cosine signal offset correction value $e_c$. An angle calculator 10 receives the sine signal to which the sine signal offset correction value $e_s$ is added and the cosine signal to which the cosine signal offset correction value $e_c$ is added, and calculates an angle signal θr. An offset correction value computing means 11 calculates the sine signal offset correction value $e_s$ and the cosine signal offset correction value $e_c$ based on the angle signal θr.

Figure 3:
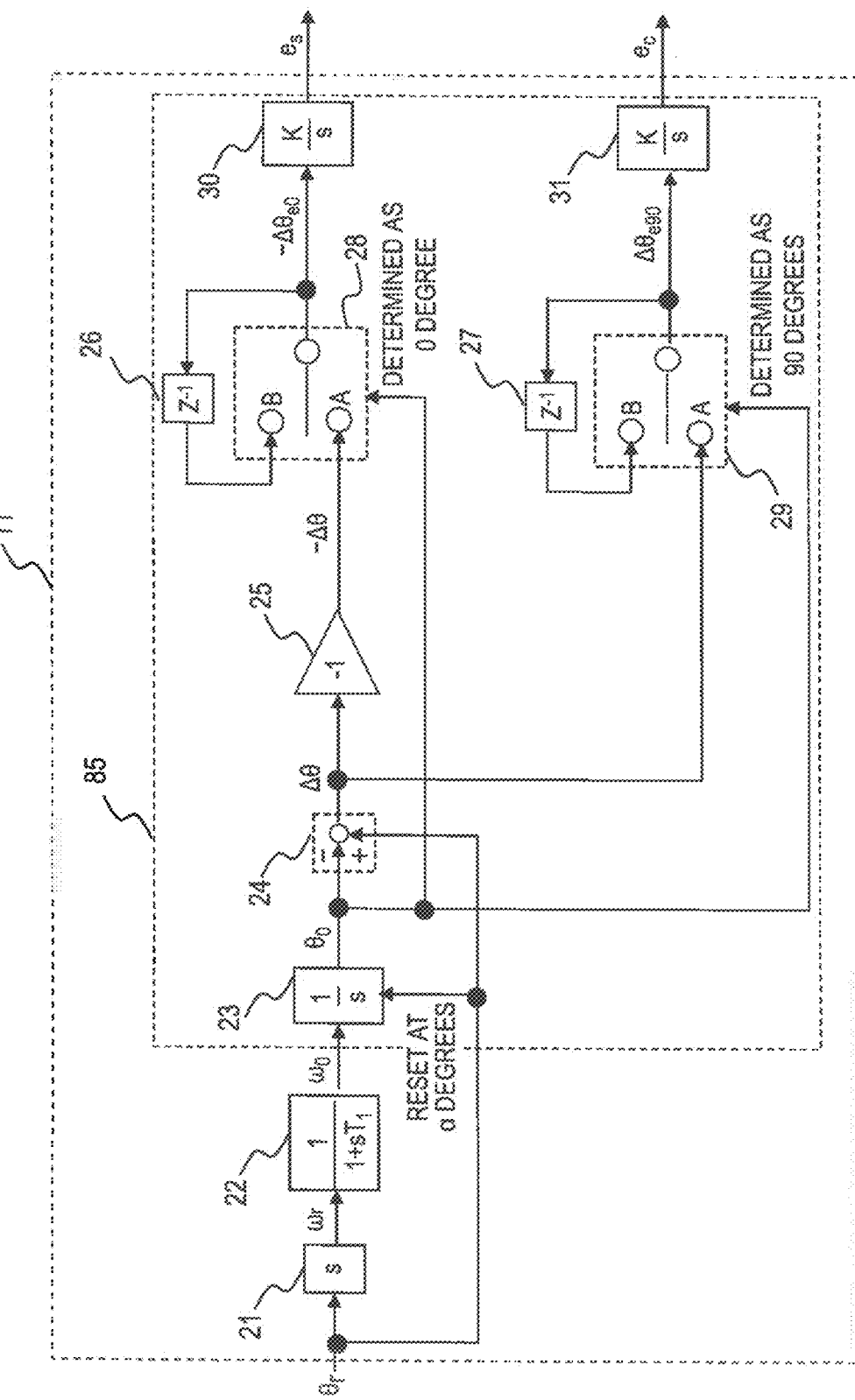
FIG. 3 is a block diagram showing the internal configuration of an offset correction value computing means in the first preferred embodiment.

Next, the offset correction value computing means 11 is described. FIG. 3 is a block diagram showing the internal configuration of the offset correction value computing means 11 in the first preferred embodiment. A differentiator 21 carries out a differentiation operation for the angle signal θr to calculate a velocity signal $\omega_r$. Here, the symbol s indicates the Laplace operator. Here, a lowpass filter 22 outputs a velocity signal $\omega_0$ obtained by removing the frequency component higher than a time constant $T_1$ from the velocity signal $\omega_r$. The time constant $T_1$ is set to a value for blocking the electrical angle frequency of the angle signal, that is, the frequency of the 1f angle error. Therefore, the frequency component that is equal to or higher than the electrical angle frequency of the angle signal is blocked in the velocity signal $\omega_0$.

An offset correction value computing unit 85 outputs the sine signal offset correction value $e_s$ and the cosine signal offset correction value $e_c$ based on the input angle signal θr and the input velocity signal $\omega_0$. An integrator 23 integrates the velocity signal $\omega_0$ and outputs the angle signal $\theta_0$.

Here, the angle signal $\theta_0$ contains the function to reference the angle signal θr and reset the angle signal $\theta_0$ to the value of the angle signal θr when the angle signal θr passes a predetermined reference angle α degrees. Thus, the angle signal $\theta_0$ is one obtained by integrating the velocity signal $\omega_0$, and therefore, the angle signal $\theta_0$ is an angle signal from which the frequency component equal to or higher than the electrical angle frequency of the angle signal is removed from the angle signal θr. A subtracter 24 subtracts the angle signal $\theta_0$ from the angle signal θr, and calculates an angle error Δθ, from which the frequency component lower than the electrical angle frequency of the angle signal θr has been removed.

This configuration can eliminate the influence of velocity variation of the rotary machine from the angle signal θr when extracting the angle error Δθ because the frequency of velocity variation of the rotary machine is generally lower than the 1f angle error. Therefore, it becomes possible to compute the offset correction value accurately. When the angle error Δθ is input, a gain 25 outputs an angle error inverted value −Δθ obtained by multiplying the angle error Δθ by −1. In delay units 26 and 27, a reference character z indicates an operator representing transform, and each of the delay units 26 and 27 outputs a signal that has been input one operation cycle earlier of the offset correction value computing means 11.

A switch 28 has two inputs A and B. It outputs the input A (angle error inverted value −Δθ) when it is determined that the angle signal $\theta_0$ has passed approximately 0 degrees, and outputs the input B (one operation cycle earlier value of the output of the switch 28) in other cases.

Accordingly, the output of the switch 28 is an angle error inverted value $-\Delta\theta_{e0}$ at the time when the angle signal $\theta_0$ has passed approximately 0 degrees, and the output of the switch is updated every time the angle signal $\theta_0$ passes approximately 0 degrees again. The switch 28 according to the first preferred embodiment is configured to output the angle error inverted value $-\Delta\theta_{e0}$ at the time when the angle signal $\theta_0$ passes approximately 0 degrees. However, it is also possible to employ such a configuration that, when it is determined that the angle signal $\theta_0$ has passed approximately 180 degrees, the switch 28 outputs input A (angle error Δθ), and in other cases, the switch 28 outputs input B (one operation cycle earlier value of the output of the switch 28) and inputs it into an integrator 30.

In this case, the output of the switch 28 is an angle error $\Delta\theta_{e180}$ at the time when the angle signal $\theta_0$ has passed approximately 180 degrees, and the output is updated every time the angle signal passes approximately 180 degrees. Alternatively, it is also possible to employ the following configuration. The angle error inverted value $-\Delta\theta_{e0}$ and the angle error $\Delta\theta_{e180}$ may be output from the switch 28. The average value $\Delta\theta_{e0-180}$ thereof is obtained, and is input to the integrator 30.

A switch 29 has two inputs A and B. It outputs the input A (angle error Δθ) when it is determined that the angle signal $\theta_0$ has passed approximately 90 degrees, and outputs the input B (one operation cycle earlier value of the output of the switch 29) in other cases. Accordingly, the output of the switch 29 is an angle error $\Delta\theta_{e90}$ at the time when the angle signal $\theta_0$ has passed approximately 90 degrees, and the output is updated every time the angle signal $\theta_0$ passes approximately 90 degrees again.

The switch 29 according to the first preferred embodiment is configured to output the angle error $\Delta\theta_{e90}$ at the time when the angle signal $\theta_0$ has passed approximately 90 degrees. However, it is also possible to employ such a configuration that, when it is determined that the angle signal $\theta_0$ has passed approximately 270 degrees, the switch 29 outputs input A (angle error inverted value −Δθ), and in other cases, the switch 29 outputs input B (one operation cycle earlier value of the output of the switch 29) and inputs it into an integrator 31. In this case, the output of the switch 29 is an angle error inverted value $-\Delta\theta_{e270}$ at the time when the angle signal $\theta_0$ has passed approximately 270 degrees, and the output is updated every time the angle signal passes approximately 270 degrees. Alternatively, it is also possible to employ the following configuration. The switch 29 outputs the angle error $\Delta\theta_{e90}$ and the angle error inverted value $-\Delta\theta_{e270}$. The average value $\Delta\theta_{e90-270}$ thereof is obtained, and is input to the integrator 31.

The integrator 30 outputs a value obtained by integrating the angle error inverted value $-\Delta\theta_{e0}$ as the sine signal offset correction value $e_s$. Likewise, the integrator 31 outputs a value obtained by integrating the angle error inverted value $-\Delta\theta_{e90}$ as the cosine signal offset correction value $e_c$. Here, a reference character K denotes feedback gain. By adjusting this, the computation response of the sine signal offset correction value $e_s$ and the cosine signal offset correction value $e_c$ from the angle signal θr is adjusted.

Figure 4:
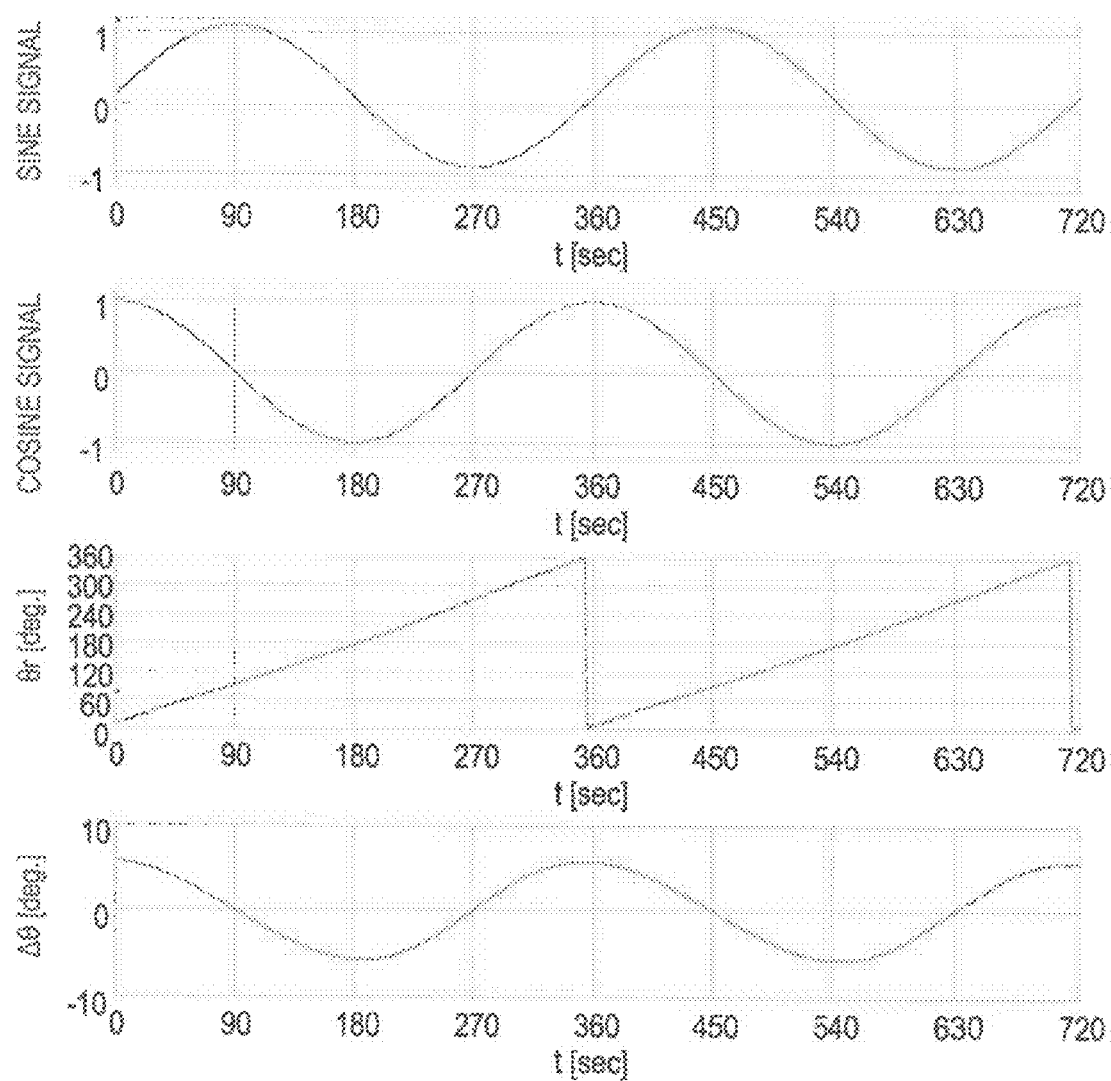
FIG. 4 shows waveform charts showing a sine signal, a cosine signal, an angle signal, and an angle error in a case where a certain value of offset error is given to the sine signal in the first preferred embodiment.

Next, the computation for offset correction values of this invention will be described. FIG. 4 shows a waveform of the sine signal in the topmost graph, that of the cosine signal in the second graph from the top, that of the angle signal θr [degree] in the third graph, and that of the angle error Δθ [degree] in the fourth graph, when the rotary machine is rotating at a constant velocity. The horizontal axis represents time t [sec]. Here, a certain value of offset error is given to the sine signal. On the other hand, the offset error of the cosine signal is set to zero. In this case, the angle signal θr has a 1f angle error with approximately the same phase as that of the cosine signal. The previously-mentioned output of the switch 28 is the angle error inverted value $-\Delta\theta_{e0}$ at the time when the angle signal $\theta_0$ has passed approximately 0 degrees, so it corresponds to the cosine component of the angle error Δθ.

Figure 5:
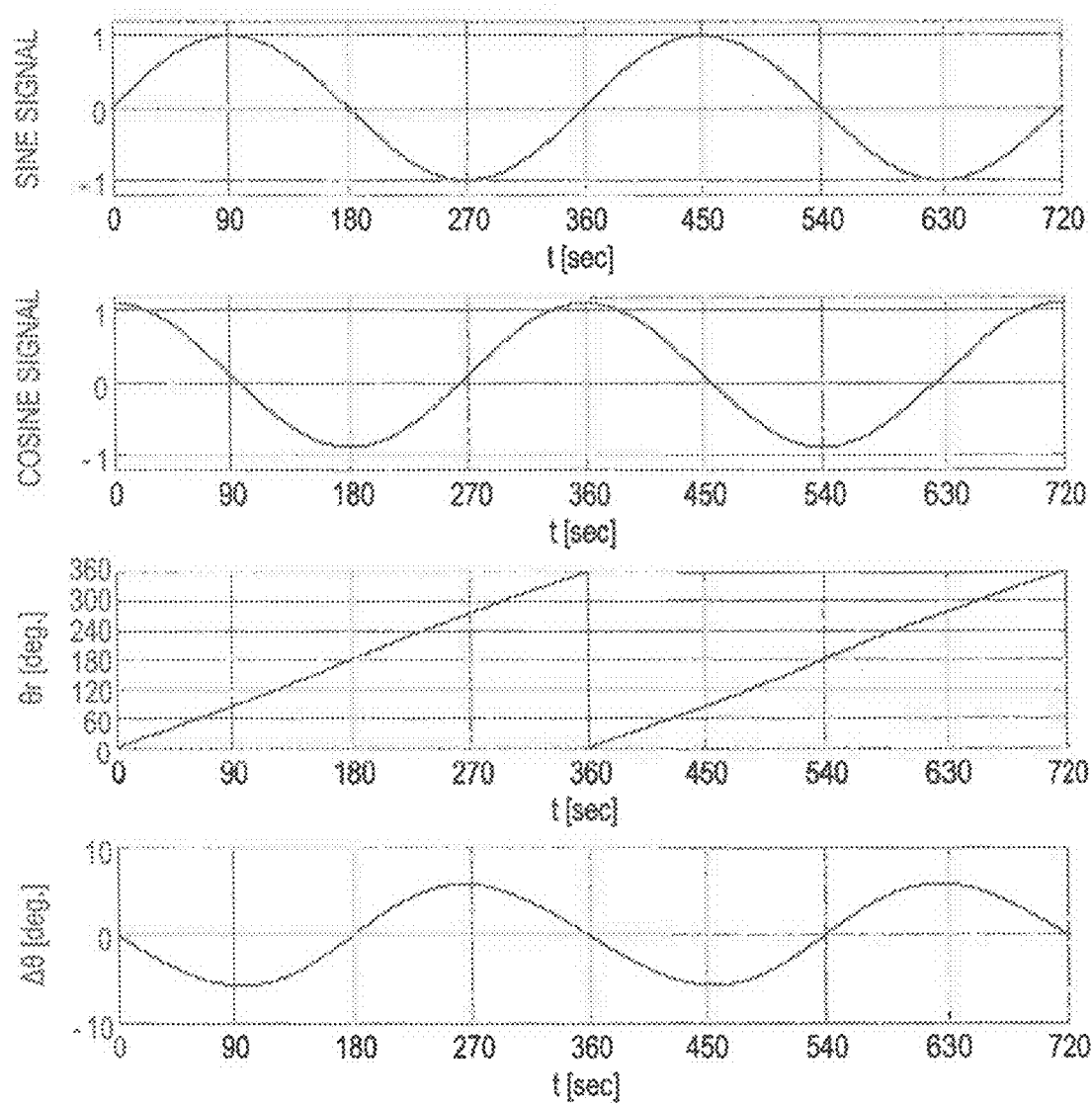
FIG. 5 shows waveform charts showing a sine signal, a cosine signal, an angle signal, and an angle error in a case when a certain value of offset error is given to the cosine signal in the first preferred embodiment.

FIG. 5 shows the waveforms when a certain value of offset error is given to the cosine signal and the offset error of the sine signal is set to zero with respect to FIG. 4. In this case, the angle signal θr has a 1f angle error with approximately the opposite phase to that of the sine signal. The previously-mentioned output of the switch 29 is the angle error $\Delta\theta_{e0}$ at the time when the angle signal $\theta_0$ has passed approximately 90 degrees, so it corresponds to the sine component of the angle error inverted value −Δθ. As can be seen from the relationship between FIGS. 4 and 5, the offset error of the sine signal is the cosine component of the angle error Δθ, and the offset error of the cosine signal is the sine component of the angle error inverted value −Δθ.

In this invention, the frequency component that is lower than the frequency of the 1f angle error is removed from the angle signal θr. Using the angle error Δθ obtained by extracting the frequency component equal to or higher than the frequency of the 1f angle error, an offset correction value for the sine signal is obtained from cosine component of the inverted value −Δθ of the 1f angle error. Then, the obtained offset correction value for the sine signal is added to the sine signal, and an offset correction value for the cosine signal is obtained from the sine component of the angle error Δθ. The obtained offset correction value for the cosine signal is added to the cosine signal, whereby the angle signal θr is obtained.

In the case where the angle error Δθ is represented approximately as the following equation (1), the sine component is represented as θ1f cos(α) and the cosine component is represented as θ1f sin(α), when converting equation (1) into equation (2), and these are obtained in equation (2) when θ=0 degrees and when θ=90 degrees, respectively. So, taking this into account, the angle error inverted value $-\Delta\theta_{e0}$ and the angle error $\Delta\theta_{e90}$ are obtained from the switch 28 and the switch 29, respectively, in the first preferred embodiment.

$$\Delta\theta = \theta 1 f \sin(\theta + \alpha) \quad (1)$$

$$\Delta\theta = \theta 1 f \cos(\alpha)\sin(\theta) + \theta 1 f \sin(\alpha)\cos(\theta) \quad (2)$$

However, in equations (1) and (2), θ1f is the amplitude of the 1f angle error, θ is the angle (electrical angle) of the rotary machine, and α is the initial phase angle of the angle error Δθ.

Figure 6:
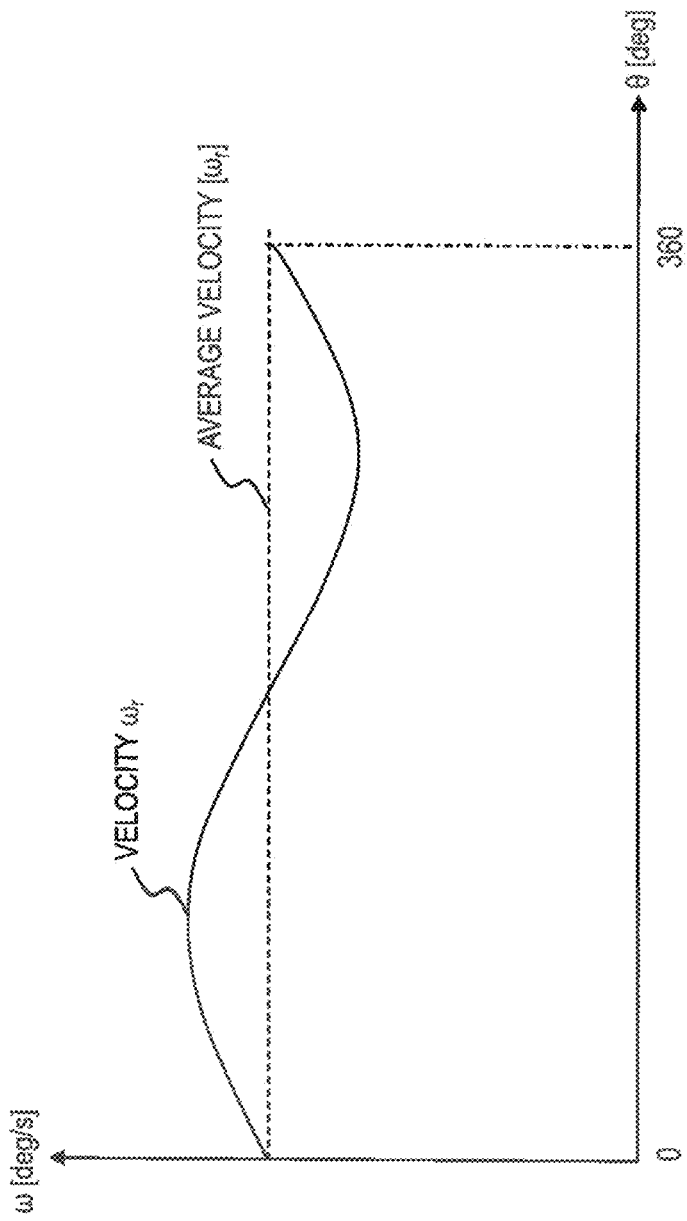
FIG. 6 is a graph showing velocity signal $\omega_r$ and average velocity [$\omega_r$].

In the first preferred embodiment, it is possible that the low-pass filter 22 may be a second order or higher low-pass filter, other than the first order low-pass filter as shown in FIG. 3. In the first preferred embodiment, the velocity signal $\omega_0$ is computed by the differentiator 21 and the low-pass filter 22. However, as the computation for calculating the velocity signal $\omega_0$, it is possible that, for example, the velocity may be estimated from the voltage equation of the rotary machine and used as the velocity signal $\omega_0$. In addition, it is possible to obtain the average velocity $[\omega_r]$ in an electrical angle cycle from the velocity signal $\omega_r$. FIG. 6 is a graph in which velocity signal $\omega_r$ and average velocity $[\omega_r]$ are plotted. When the horizontal axis represents angle θ (electrical angle) [degree] of the rotary machine and the vertical axis represents velocity ω [degree/s], the velocity signal $\omega_r$ ripples due to the 1f angle error of the angle θr. Accordingly, it will be appreciated that it is possible: to calculate the average velocity $[\omega_r]$ of the velocity signal $\omega_r$ in one electrical angle cycle of the angle signal θr and use it as the velocity signal $\omega_0$.

Figure 7:
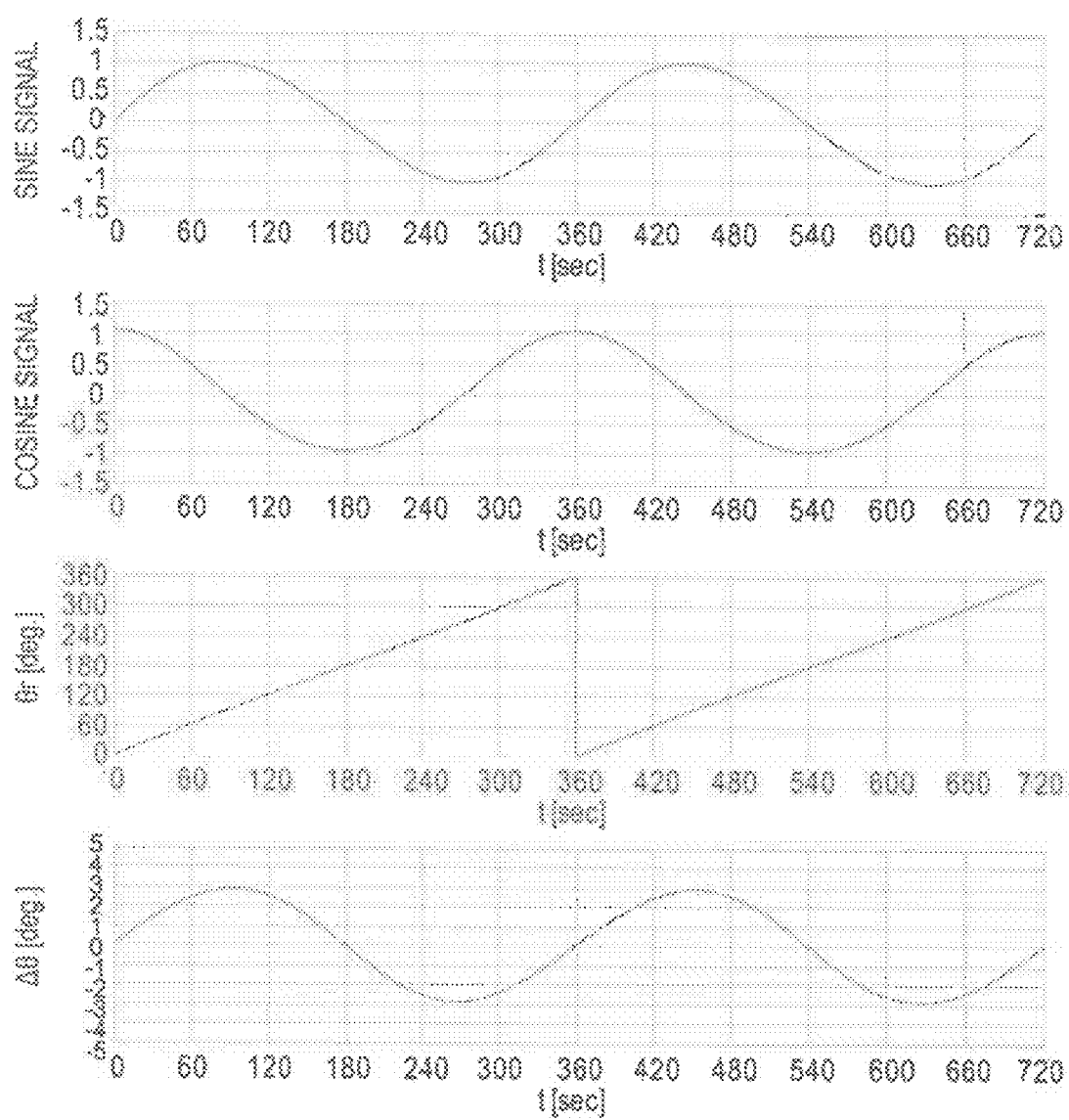
FIG. 7 shows waveform charts showing a sine signal, a cosine signal, an angle signal, and an angle error in a case where a frequency component that is two times a 1f angle error is given to the sine signal and the cosine signal in the first preferred embodiment.

The conventional angle detecting apparatus has a structure in which the midpoint (offset) errors are corrected based on the sine signal and the cosine signal. The frequency component that is two times the 1f angle error, which is contained in the sine signal and the cosine signal, does not appear in the midpoint (offset), and it is impossible to correct the 1f angle error resulting from the just-mentioned component, FIG. 7 shows a waveform of the sine signal in the topmost graph, that of the cosine signal in the second graph from the top, that of the angle signal θr [degree] in the third graph, and that of the angle error Δθ [degree] in the fourth graph, when the rotary machine is rotating at a constant velocity. The horizontal axis represents time t [sec]. Here, a frequency component that is two times the 1f angle error is given to the sine signal and the cosine signal. In this case, the angle signal θr has a 1f angle error.

The angle detecting apparatus according to the first preferred embodiment computes the sine signal offset correction value $e_s$ and the cosine signal offset correction value $e_c$ respectively based on the angle signal θr. Therefore, it can perform 1f angle error correction taking into consideration the 1f angle error of the an ole signal that is caused by the sine signal and the cosine signal containing a frequency component that is two times the 1f angle error. Moreover, the sine signal offset correction value and the cosine signal offset correction value are calculated so that the correction amounts thereof will be direct current quantities, the errors resulting from phase shift, such as those observed in the conventional angle detecting apparatus, do not occur even when there is wasted time in calculating the offset correction, values. Therefore, the configuration according to the first preferred embodiment can obtain an advantageous effect that it becomes possible to use a low cost CPU, which has a low computing speed.

Second Preferred Embodiment

Figure 8:
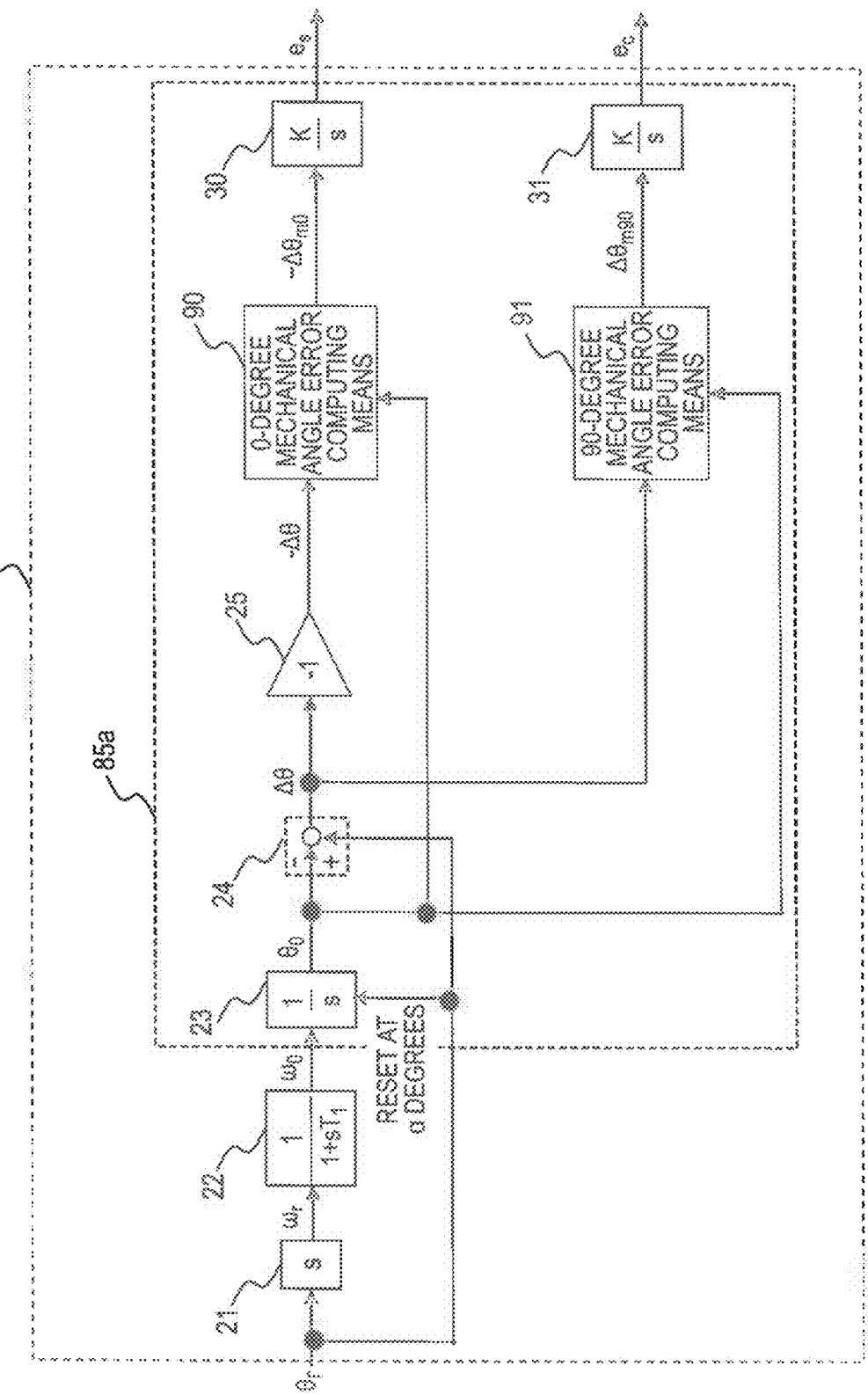
FIG. 8 is a block diagram showing the internal configuration of an offset correction value computing means in a second preferred embodiment.

In the first preferred embodiment, the offset correction values are computed based on the angle signal of electrical angle cycle. However, the offset correction values may be computed based on an angle signal with a period of an integer multiple of the rotary machine mechanical angle cycle. FIG. 8 is a block diagram, showing the internal configuration of an offset correction value computing means 11a in the second preferred embodiment, in which similar or corresponding parts to the first preferred embodiment are denoted by the same reference symbols.

An offset correction value computing unit 85a outputs the sine signal offset correction value $e_s$ and the cosine signal offset correction value $e_c$ based on the input angle signal θr and the input velocity signal $\omega_0$. A feature of the second preferred embodiment is that a 0-degree mechanical angle error computing means 90 is provided downstream of the inverted value $-\Delta\theta$ of the angle error Δθ and that a 90-degree mechanical angle error computing means 91 is provided downstream of the angle error Δθ. The resolver 1 has a rotor with an N angle multiplication factor, which outputs a signal for N rotations when the rotation shaft of the rotary machine rotates one rotation.

In many cases, the angle signals for N rotations at the time when the rotary machine rotates one rotation contain different angle errors from each other. For this reason, it is desirable that the correction of the angle error be performed every mechanical angle cycle of the rotary machine.

So, the 0-degree mechanical angle error computing means 90 executes the following calculation if it is determined that the angle signal $\theta_0$ has passed 0 degrees.

$$-\Delta\theta_{m0} = (-\Delta\theta - \Delta\theta_{0-1} - \Delta\theta_{0-2} \ldots - \Delta\theta_{0-(N-1)})/N \quad (3)$$

Here, $\Delta\theta_{0-i}$ (i=1 to N−1) represents the value of Δθ at the time when it was determined that the angle signal $\theta_0$ passed 0 degrees i times before the computation of equation (3), and N represents an angle multiplication factor. On the other hand, if it is not determined that the angle signal $\theta_0$ has passed 0 degrees, it outputs the value that was obtained by equation (3) at the last time when it was determined that the angle signal $\theta_0$ passed 0 degrees.

Here, instead of executing the calculation of equation (3), the 0-degree mechanical angle error computing means 90 may execute the calculation according to the following equation (4) using the angle error Δθ in the case where it was determined that the angle signal $\theta_0$ passed 180 degrees.

$$\Delta\theta_{m180} = (\Delta\theta + \Delta\theta_{180-1} - \Delta\theta_{180-2} \ldots - \Delta\theta_{180-(N-1)})/N \quad (4)$$

Here, $\Delta\theta_{180-i}$ (i=1 to N−1) represents the value of Δθ at the time when it was determined that the angle signal $\theta_0$ is 180 degrees i times before the computation of equation (4), and N represents an angle multiplication factor. If it is not determined that the angle signal $\theta_0$ has passed 180 degrees, it outputs the value that was obtained by equation (4) at the last time when it was determined that the angle signal $\theta_0$ passed 180 degrees.

Likewise, the 90-degree mechanical angle error computing means 91 executes the following calculation if it is determined that the angle signal $\theta_0$ has passed 90 degrees.

$$\Delta\theta_{m90} = (\Delta\theta + \Delta\theta_{90-1} + \Delta\theta_{90-2} \ldots + \Delta\theta_{90-(N-1)})/N \quad (5)$$

Here, $\Delta\theta_{90-i}$ (i=1 to N−1) represents the value of Δθ at the time when it was determined that the angle signal $\theta_0$ is 90 degrees i times before the computation of equation (5), and N represents an angle multiplication factor.

If it is not determined that the angle signal $\theta_0$ has passed 90 degrees, it outputs the value that was obtained by equation (5) at the last time when it was determined that the angle signal $\theta_0$ passed 90 degrees.

Likewise, instead of executing the calculation of equation (5), the 90-degree mechanical angle error computing means 91 may execute the calculation according to the following equation (6) using the angle error $\Delta\theta$ in the case where it was determined that the angle signal $\theta_0$ passed 270 degrees.

$$-\Delta\theta_{m270}=(-\Delta\theta-\Delta\theta_{270\text{-}1}-\Delta\theta_{270\text{-}2}\ldots-\Delta\theta_{270\text{-}(K\text{-}1)})/N \quad (6)$$

Here, $\Delta\theta_{270\text{-}1}$ (i=1 to N−1) represents the value of $\Delta\theta$ at the time when it was determined that the angle signal $\theta_0$ passed 270 degrees i times before the computation of equation (6) and N represents an angle multiplication factor. If it is not determined that the angle signal $\theta_0$ has passed 270 degrees, it outputs the value that was obtained by equation (6) at the last time when it was determined that the angle signal $\theta_0$ passed 270 degrees.

The angle error inverted value $-\Delta\theta_{m0}$ computed by equation (3) is the average value of the angle error inverted values $-\Delta\theta$ for one mechanical angle cycle of the rotary machine, in the location at which the angle signal $\theta_0$ has passed 0 degrees. Accordingly, by using the sine signal offset correction value $e_s$ obtained by inputting the angle error inverted value $-\Delta\theta_{m0}$ into the integrator 30 as the sine signal offset correction value, it is possible to carry out the correction of the sine signal corresponding to the mechanical angle cycle of the rotary machine. Furthermore, the same advantageous effects are obtained when the angle error $\Delta\theta_{m180}$ computed from equation (4) is used as the input to the integrator 30 and when equations (3) and (4) are computed to obtain the angle error inverted value $-\Delta\theta_{m0}$ and the angle error $\Delta\theta_{m180}$ and the average values thereof are used.

Likewise, the angle error $\Delta\theta_{m90}$ computed in equation (5) is the average value of the angle errors $\Delta\theta$ for one mechanical angle cycle of the rotary machine, in the location at which the angle signal $\theta_0$ has passed 90 degrees. Accordingly, by using the cosine signal offset correction value $e_c$ obtained by inputting the angle error $\Delta\theta_{m90}$ into the integrator 31, it is possible to carry out the correction of the cosine signal corresponding to the mechanical angle cycle of the rotary machine. Furthermore, the same advantageous effects are obtained when the angle error inverted value $-\Delta\theta_{m270}$ computed from equation (6) is used as the input to the integrator 31 and when equations (5) and (6) are computed to obtain the angle error $\Delta\theta_{m90}$ and the angle error inverted value $-\Delta\theta_{m270}$ and the average values thereof are used.

In the computation of equations (3) through (6), the angle error or the inverted value of the angle error for the mechanical angle cycle of the rotary machine are calculated. However, if the computation period is set to be a period of an integer multiple of the mechanical angle of the rotary machine, the high-frequency noise component is smoothed and the component based on the electrical angle cycle is not produced. Therefore, the angle error or the inverted value of the angle error based on the mechanical angle cycle can be obtained highly accurately. Thus, the second preferred embodiment can perform offset correction corresponding to the mechanical angle cycle of the rotary machine.

Third Preferred Embodiment

Figure 9:
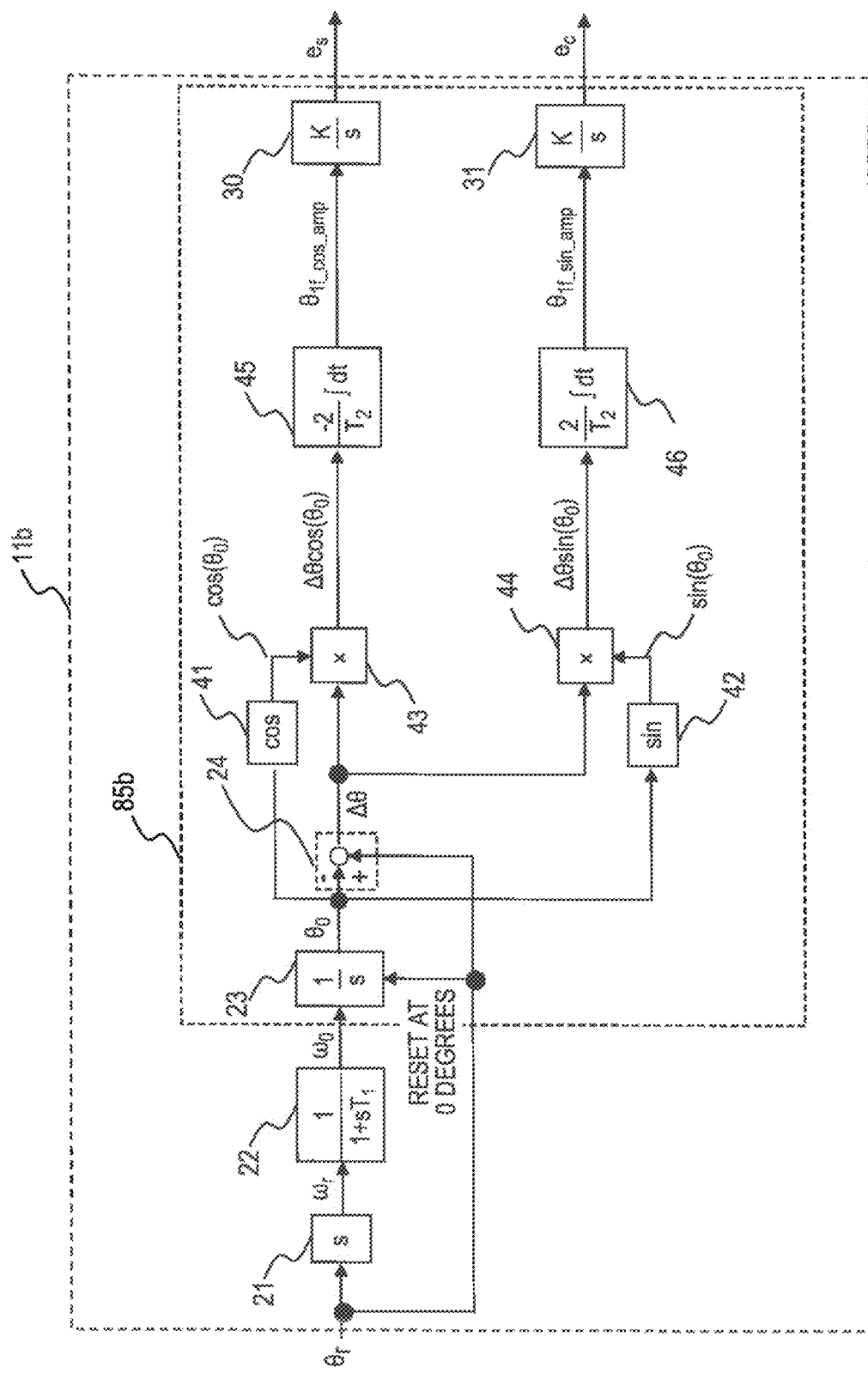
FIG. 9 is a block diagram showing the internal configuration of an offset correction value computing means in a third preferred embodiment.

FIG. 9 is a block diagram showing the internal configuration of an offset correction value computing means 11b in the third preferred embodiment, in which similar or corresponding parts to the first and second preferred embodiments are denoted by the same reference symbols. A feature of the third preferred embodiment is that the angle error $\Delta\theta$ and the angle signal $\theta_0$ are used to obtain a sine component $\theta_{1f\_sin\_amp}$ of the angle error $\Delta\theta$ to compute a cosine signal offset correction value $e_c$, and to obtain a cosine component $\theta_{1f\_cos\_amp}$ of the inverted value $-\Delta\theta$ of the angle error to compute a sine signal offset correction value $e_s$.

Hereinbelow, a computation in the third preferred embodiment will be described. An offset correction value computing unit 85b outputs the sine signal offset correction value $e_s$ and the cosine signal offset correction value $e_c$ based on the input angle signal $\theta r$ and the input velocity signal $\omega_0$. A cosine value calculator 41 calculates a cosine value cos $(\theta_0)$ of the angle signal $\theta_0$. Likewise, a sine value calculator 42 calculates a sine value sin($\theta_0$) of the angle signal $\theta_0$. A multiplier 43 multiplies the cosine value cos $(\theta_0)$ by the angle error $\Delta\theta$ to obtain $\Delta\theta$ cos($\theta_0$). Likewise, a multiplier 44 multiplies the sine value sin($\theta_0$) by the angle error $\Delta\theta$ to obtain $\Delta\theta$ sin($\theta_0$).

An integrator 45 performs the computation of the following equation (7) with $\Delta\theta$ cos($\theta_0$) to compute a cosine component $\theta_{1f\_cos\_amp}$ of the angle error inverted value $-\Delta\theta$. Here $T_2$ denotes the electrical angle cycle of the angle signal $\theta r$.

[Eq. 1]

$$\theta_{1f\_cos\_amp} = -\frac{2}{T_2}\int_{-T_2/2}^{T_2/2}\Delta\theta\cos(\theta_0)dt \quad (7)$$

Likewise, an integrator 46 performs the computation of the following equation (8) with $\Delta\theta$ sin($\theta_0$) to compute a sine component $\theta_{1f\_sin\_amp}$ of the angle error $\Delta\theta$. $T_2$ is set to the same value as that in equation (7)

[Eq. 2]

$$\theta_{1f\_sin\_amp} = \frac{2}{T_2}\int_{-T_2/2}^{T_2/2}\Delta\theta\sin(\theta_0)dt \quad (8)$$

Then, the cosine component $\theta_{1f\_cos\_amp}$ of the angle error inverted value $-\Delta\theta$ is input to the integrator 30, and the output thereof is used as the sine signal offset correction value $e_s$. Likewise, the sine component $\theta_{1f\_sin\_amp}$ of the angle error $\Delta\theta$ is input to the integrator 31, and the output thereof is used as the cosine signal offset correction value $e_c$. It should be noted that, in the computation in the integrators 45 and 46, $T_2$ may be the mechanical angle cycle of the rotary machine. This makes it possible to obtain the sine signal offset correction value $e_s$ and the cosine signal offset correction value $e_c$ that correspond to the mechanical angle cycle of the rotary machine.

Moreover, when the $T_2$ is set to an integer multiple the mechanical angle cycle of the rotary machine, the high-frequency noise component contained in the sine component and the cosine component of the angle error is smoothed, and the component used on the electrical angle cycle is not generated. Therefore, it is possible to increase the noise resistance for the just-mentioned sine signal offset correction value $e_s$ and the just-mentioned cosine signal offset correction value $e_c$ corresponding to the mechanical angle cycle of the rotary machine. As described above, in the third, preferred embodiment, the sine signal offset correction value is calculated by obtaining the cosine component contained in the angle signal, and the cosine signal offset correction value is calculated by obtaining the sine component contained in the angle signal. In addition to the advantageous effects of the first and second preferred embodiments, this makes it possible to compute the sine signal offset correction value and the cosine signal offset correction value accurately even when angle error components other than the 1f angle error are contained in the case where the angle error $\Delta\theta$ of the angle signal $\theta r$ is represented by equation (1) described in the first preferred embodiment.

The reason is explained in the following. In the first and second preferred embodiments, the offset correction values are computed based on the angle error $\Delta\theta$ when the angle signal $\theta_0$ is approximately at 0 degrees and approximately at 90 degrees. However, if the angle error $\Delta\theta$ contains angle error components other than the 1f angle error, the angle error components other than the 1f angle error are contained in addition to the cosine component and the sine component of the angle error $\Delta\theta$ respectively at the time when the angle signal $\theta_0$ is approximately at 0 degrees and approximately at 90 degrees, so the calculated offset correction values may have errors. On the other hand, in the third preferred embodiment, the cosine component and the sine component in the angle error $\Delta\theta$ are extracted respectively with the use of the integrators 45 and 46. Therefore, even when the angle error $\Delta\theta$ contains angle error components other than the 1f angle error, the 1f angle error can be extracted and the offset correction values can be computed accurately. Thus, even when the angle signal of the resolver contains angle error components other than the 1f angle error, the offset correction can be carried out accurately.

Fourth Preferred Embodiment

Figure 10:
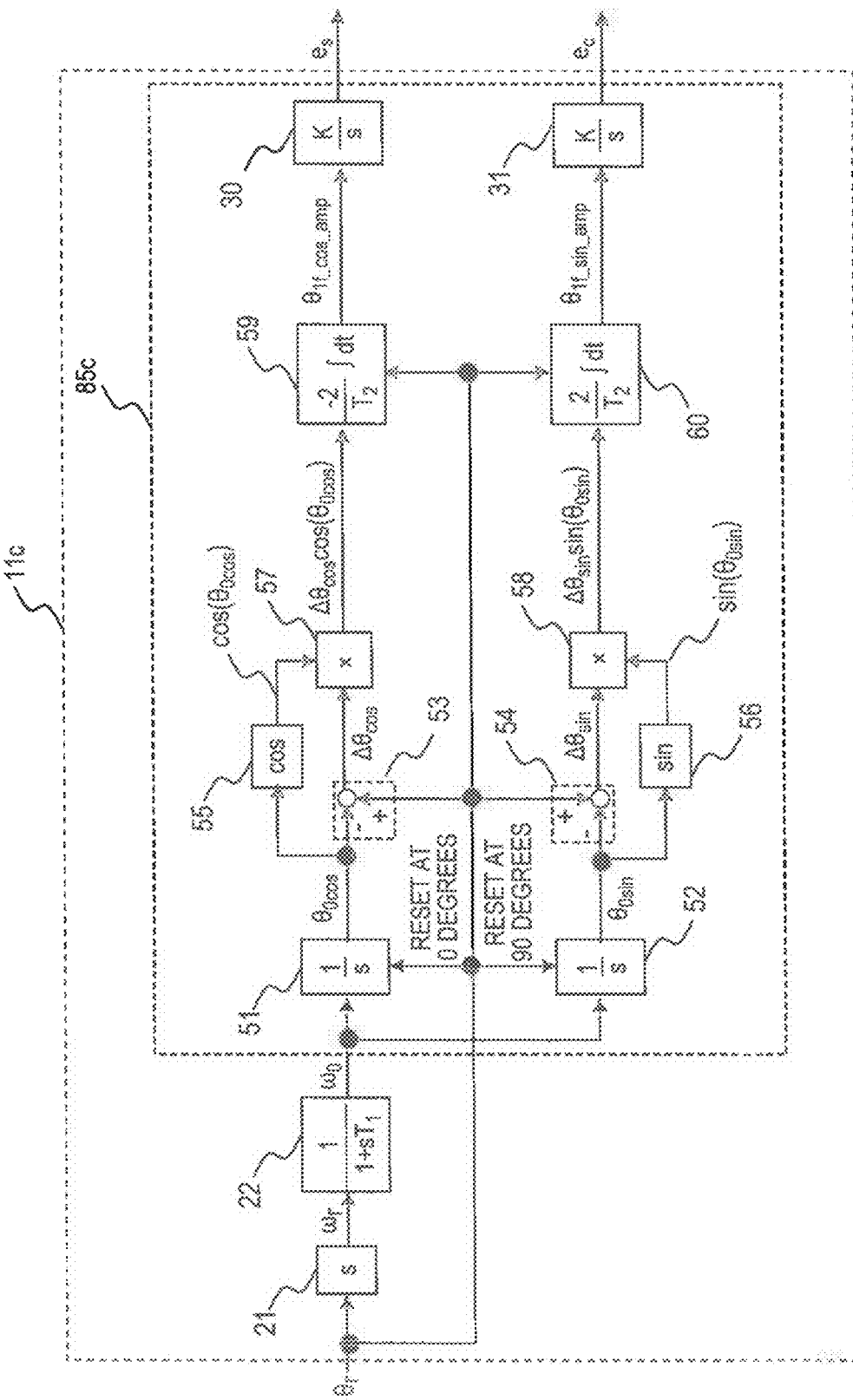
FIG. 10 is a block diagram showing the internal configuration of an offset correction value computing means in a fourth preferred embodiment.

FIG. 10 is a block diagram showing the internal configuration of an offset correction value computing means 11c in the fourth preferred embodiment, in which similar or corresponding parts to the first through third preferred embodiments are denoted by the same reference symbols. An offset correction value computing unit 85c outputs the sine signal offset correction value $e_s$ and the cosine signal offset correction value $e_c$ based on the input angle signal $\theta r$ and the input, velocity signal $\omega_0$. When the velocity signal $\omega_0$ has an offset error for the revolution speed of the rotary machine, there may be a case where the sine signal offset correction value and the cosine signal offset correction value have errors.

Figure 11:
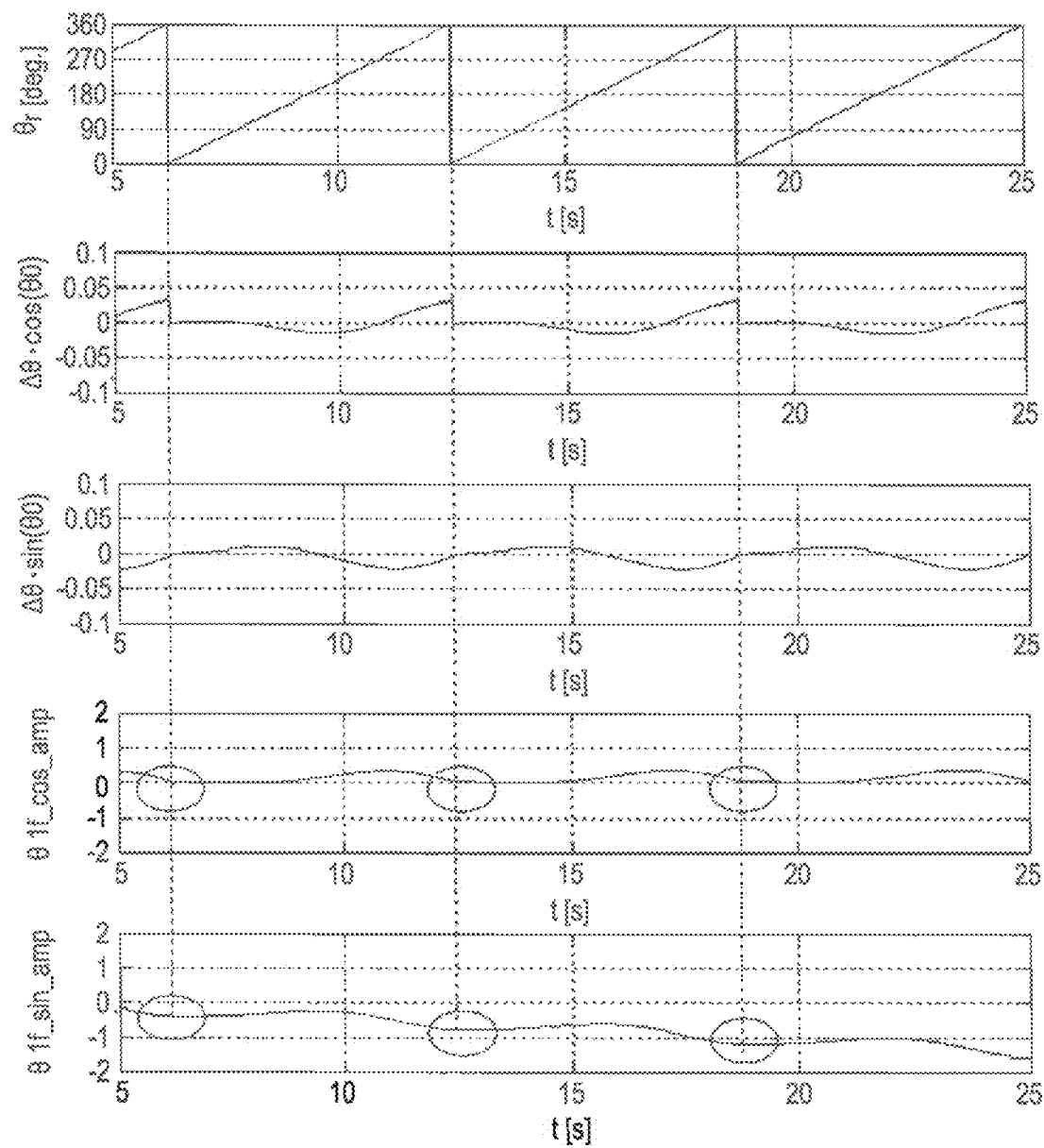
FIG. 11 shows waveform charts showing computed waveforms in respective parts of FIG. 9 when the velocity signal has an offset error relative to the velocity of a rotary machine in a case where the reset value α of an integrator is set to 0 degrees, in the configuration of the third preferred embodiment.

As an example, FIG. 11 shows computed waveforms in the respective parts of FIG. 9 when the velocity signal $\omega_0$ has an offset error relative to the velocity of the rotary machine in the case where the reset value $\alpha$ of the integrator 22 is set to 0 degrees, in the configuration of the third preferred embodiment. FIG. 11 shows that the sine component $\theta_{1f\_sin\_amp}$ of the angle error $\Delta\theta$ does not become 0 when the signal passes 0 degrees, which is the reset value, and that the error increases.

Hereinbelow, in order to resolve such a problem, the fourth preferred embodiment introduces an integrator 51 for resetting an angle signal. $\theta_{0\ cos}$, which is the output therefrom, to the value of the angle signal $\theta r$ at the location at which the angle signal $\theta r$ passes 0 degrees, to obtain the cosine component of the angle signal. It also introduces an integrator 52 for resetting an angle signal $\theta_{0\ sin}$, which is the output therefrom, to the value of the angle signal $\theta r$, to calculate the cosine signal offset correction value $e_c$ at the location at which the angle signal $\theta r$ passes 90 degrees. A subtracter 53 subtracts the angle signal $\theta_{cos}$ from the angle signal $\theta r$ and calculates an angle error $\Delta\theta$. Likewise, a subtracter 54 subtracts the angle signal $\theta_{0\ sin}$ from the angle signal $\theta r$, and calculates an angle error $\Delta\theta_{sin}$.

A cosine value calculator 55 calculates a cosine value $\cos(\theta_{0\ cos})$ of the angle signal $\theta_{0\ cos}$.

Likewise, a sine value calculator 56 calculates a sine value $\sin(\theta_{0\ sin})$ of the angle signal $\theta_{0\ sin}$. A multiplier 57 multiplies the cosine value $\cos(\theta_{0\ cos})$ by the angle error $\Delta\theta_{cos}$ to calculate $\Delta\theta_0$, $\cos(\theta_{0\ cos})$. Likewise, a multiplier 58 multiplies the sine value $\sin(\theta_{0\ sin})$ by the angle error $\Delta\theta_{sin}$ to calculate $\Delta\theta_{sin} \sin(\theta_{0\ sin})$.

An integrator 59 performs the computation of the following equation (9) with $\Delta\theta \cos(\theta^{0\ cos})$ to compute a cosine component $\theta_{1f\_cos\_amp}$ of the angle error inverted value $-\Delta\theta_{cos}$. Here, $T_2$ is the value explained in the third preferred embodiment. Hereinbelow, resetting of equation (9) is discussed. In the case where $T_2$ is selected to be the angle cycle of the angle signal $\theta r$, $\theta_{1f\_cos\_amp}$ is reset to 0 and the computation of equation (9) is started again when the angle signal $\theta r$ passes 0 degrees. In the case where $T_2$ is set to be M times (M: natural number) the mechanical angle cycle of the rotary machine, $\theta_{1f\_cos\_amp}$ is reset to 0 and the computation of equation (9) is started every time the angle signal $\theta r$ passes 0 degrees for the number of times obtained by multiplying an angle multiplication factor N of the resolver by the integer M.

[Eq. 3]

$$\theta_{1f\_cos\_amp} = -\frac{2}{T_2} \int_{-T_2/2}^{T_2/2} \Delta\theta_{cos} \cos(\theta_{0cos}) dt \quad (9)$$

Likewise, an integrator 60 performs the computation of the following equation (10) with $\Delta\theta_{sin} \sin(\theta_{0\ sin})$ to compute a sine component $\theta_{1f\_sin\_amp}$ of the angle error $\Delta\theta_{sin}$. Here, $T_2$ is the value explained in the third preferred embodiment. Hereinbelow, resetting of equation (10) is discussed. In the case where $T_2$ is selected to be the angle cycle of the angle signal $\theta r$, $\theta_{1f\_sin\_amp}$ is reset to 0 and the computation of equation (10) is started again when the angle signal $\theta r$ passes 90 degrees. In the case where $T_2$ is set to be M times (M: natural number) the mechanical angle cycle of the rotary machine, $\theta_{1f\_sin\_amp}$ is reset to 0 and the computation of equation (10) is started every time the angle signal $\theta r$ passes 90 degrees for the number of times obtained by multiplying an coals multiplication factor N of the resolver by the integer M.

[Eq. 4]

$$\theta_{1f\_sin\_amp} = \frac{2}{T_2} \int_{-T_2/2}^{T_2/2} \Delta\theta_{sin} \cos(\theta_{0sin}) dt \quad (10)$$

Then, the cosine component of the angle error inverted value $-\Delta\theta$ is input to the integrator 30, and the output thereof is used as the sine signal offset correction value $e_s$. Likewise, the sine component $\theta_{1f\_sin\_amp}$ of the angle error $\Delta\theta_{sin}$ is input to the integrator 31, and the output thereof is used as the cosine signal offset correction value $e_c$.

Figure 12:
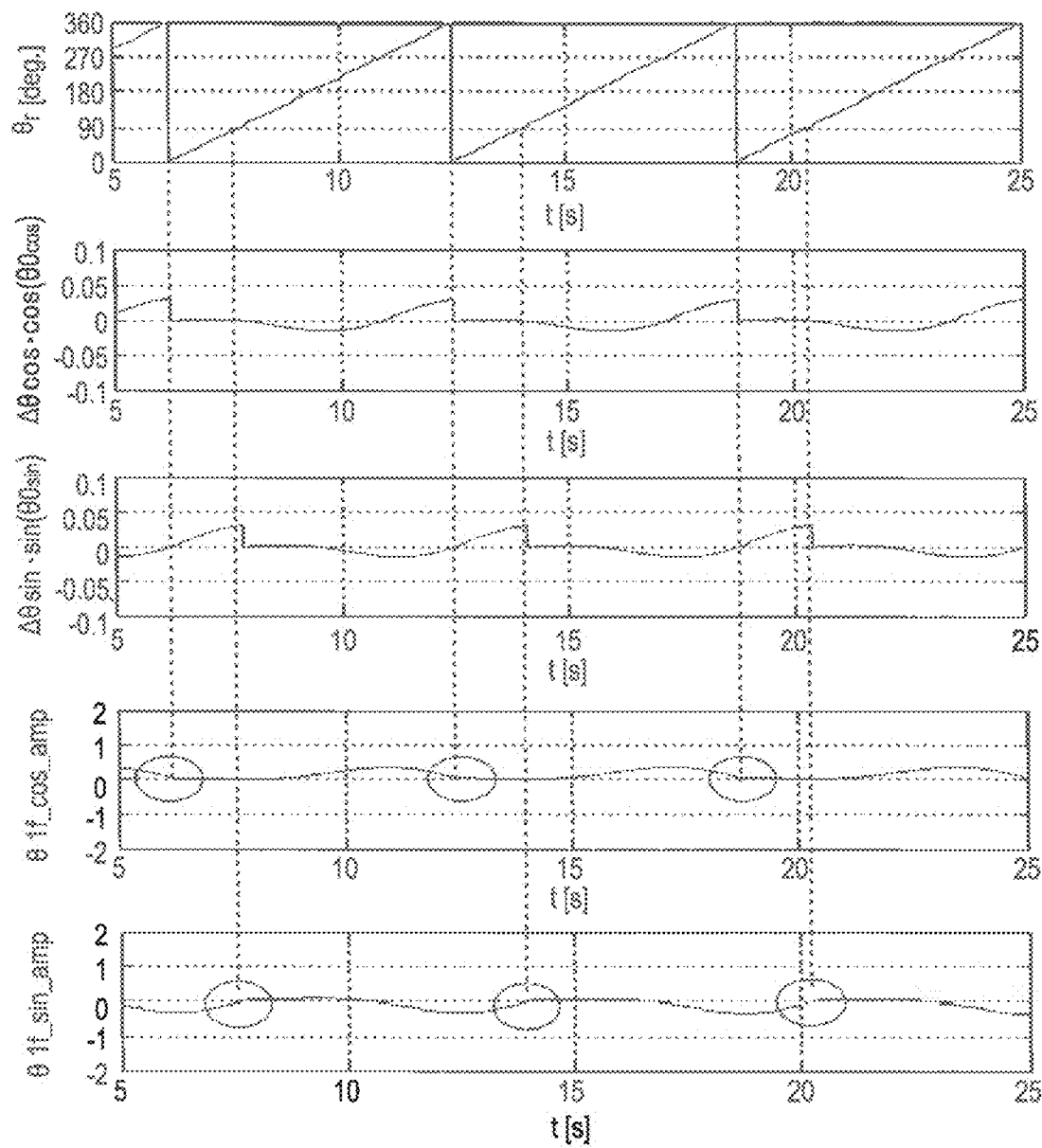
FIG. 12 shows waveform charts showing computed waveforms in respective parts of FIG. 10 when the velocity signal has an offset error relative to the velocity of a rotary machine, in the configuration of the fourth preferred embodiment.

FIG. 12 shows computed waveforms in respective parts of FIG. 10 when the velocity signal $\omega_0$ has an offset error relative to the velocity of a rotary machine, in the configuration of the fourth preferred embodiment. FIG. 12 shows that the cosine component $\theta_{1f\_cos\_amp}$ of the angle error inverted value $-\Delta\theta_{cos}$ becomes 0 when the angle signal passes 0 degrees, which is the reset value, and that, likewise, the sine component $\theta_{1f\_sin\_amp}$ of the angle error $\Delta\theta_{sin}$ becomes 0 when the angle signal passes 90 degrees, which is the reset value. So, the influence of the offset error is not accumulated. As described above, according to the fourth preferred embodiment, the sine component is obtained from the location at which the angle signal passes through 90 degrees or 270 degrees, and the cosine component is obtained from the location at which the angle signal passes through 0 degrees or 180 degrees. Therefore, in addition to the advantageous effects of the first through three preferred embodiments, it becomes possible to compute the offset correction values accurately, even when the velocity signal $\omega_0$ obtained from the angle signal has offset errors relative to the actual velocity of the rotary machine.

Fifth Preferred Embodiment

In the computation of the velocity signal $\omega_0$ in the first through fourth preferred embodiments, when the velocity of the rotary machine is low, the frequency of velocity variation of the rotary machine and the frequency of 1f angle error are brought close to each other. This cases the offset correction values to nave correction errors. This is because, in the low-pass filter 22 in the first through third preferred embodiments, it becomes difficult to design such a filter that blocks the frequency component of the 1f angle error and also allows the frequency component of the velocity variation of the rotary machine to pass therethrough.

Figure 13:
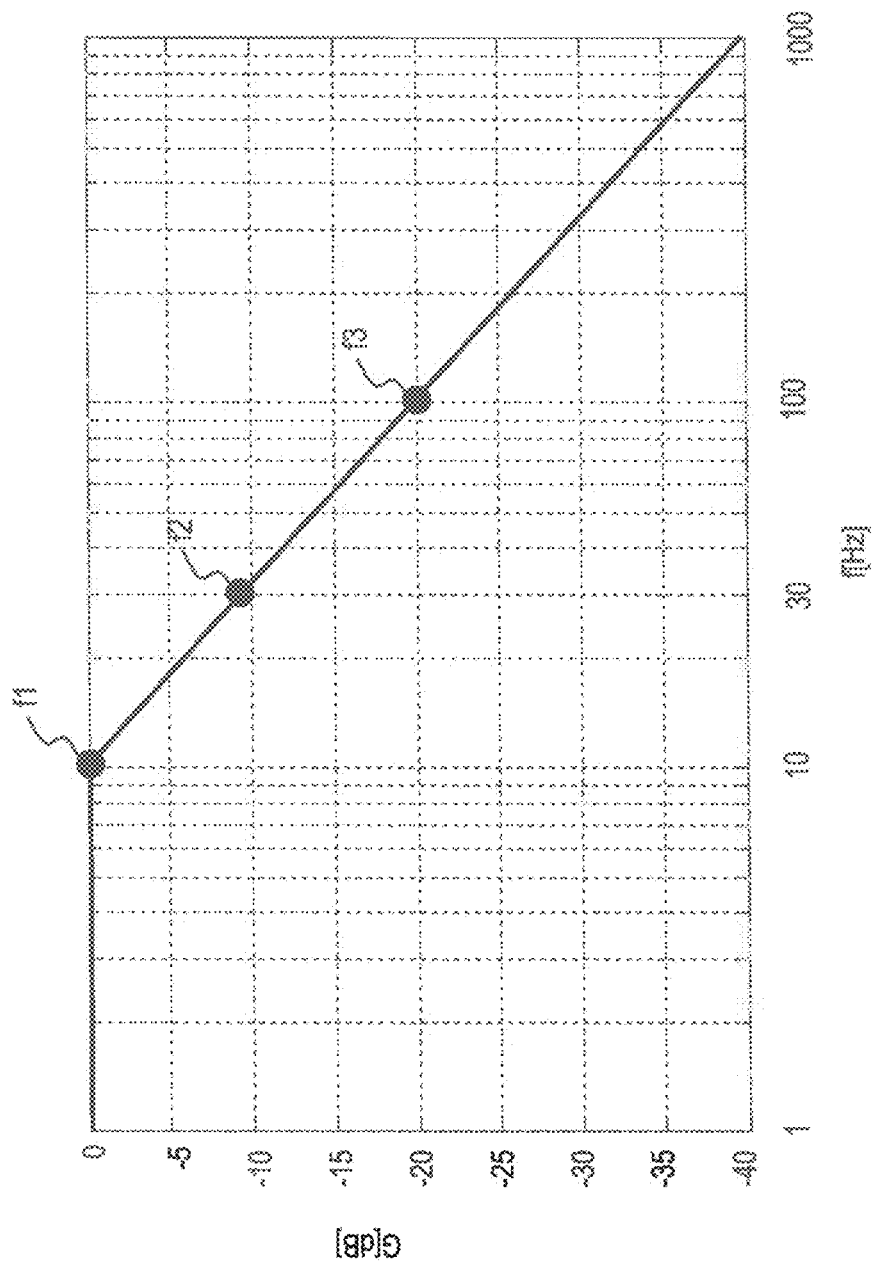
FIG. 13 is a Bode diagram showing the relationship between the frequency of velocity variation, of a rotary machine and a 1f angle error.

The reason why the designing of the filter becomes difficult will be explained in the following. As an example, it is assumed that the frequency of the velocity variation of the rotary machine is 10 Hz and the 1f angle error is −20 dB or lower. At this time, when the order of the low-pass filter 22 is set to 1 and the cut-off frequency thereof is set to f1 (=10 Hz), the Bode diagram (approximation line profile) as shown in FIG. 13 is obtained, which shows that the gain G is 0 [dB] in the region equal to or lower than the frequency f1. Therefore, the frequency of velocity variation is allowed to pass through the low-pass filter. Moreover, when the frequency of the 1f angle error is f3 (=100 Hz) or higher, the gain G becomes −20 dB or lower, which satisfies the target. However, when the frequency of the 1f angle error is lower than f3, the gain G exceeds −20 dB, which does not satisfy the target. For example, when the frequency of the 1f angle error is f2 (=30 Hz), the gain G is about −9 dB, which does not satisfy the target.

Therefore, the target is not satisfied unless the frequency of the 1f angle error is 10 times or higher the frequency of the velocity variation. For the reason stated above, the designing of the filter becomes difficult when the frequency of the 1f angle error becomes close to the frequency of the velocity variation.

Figure 14:
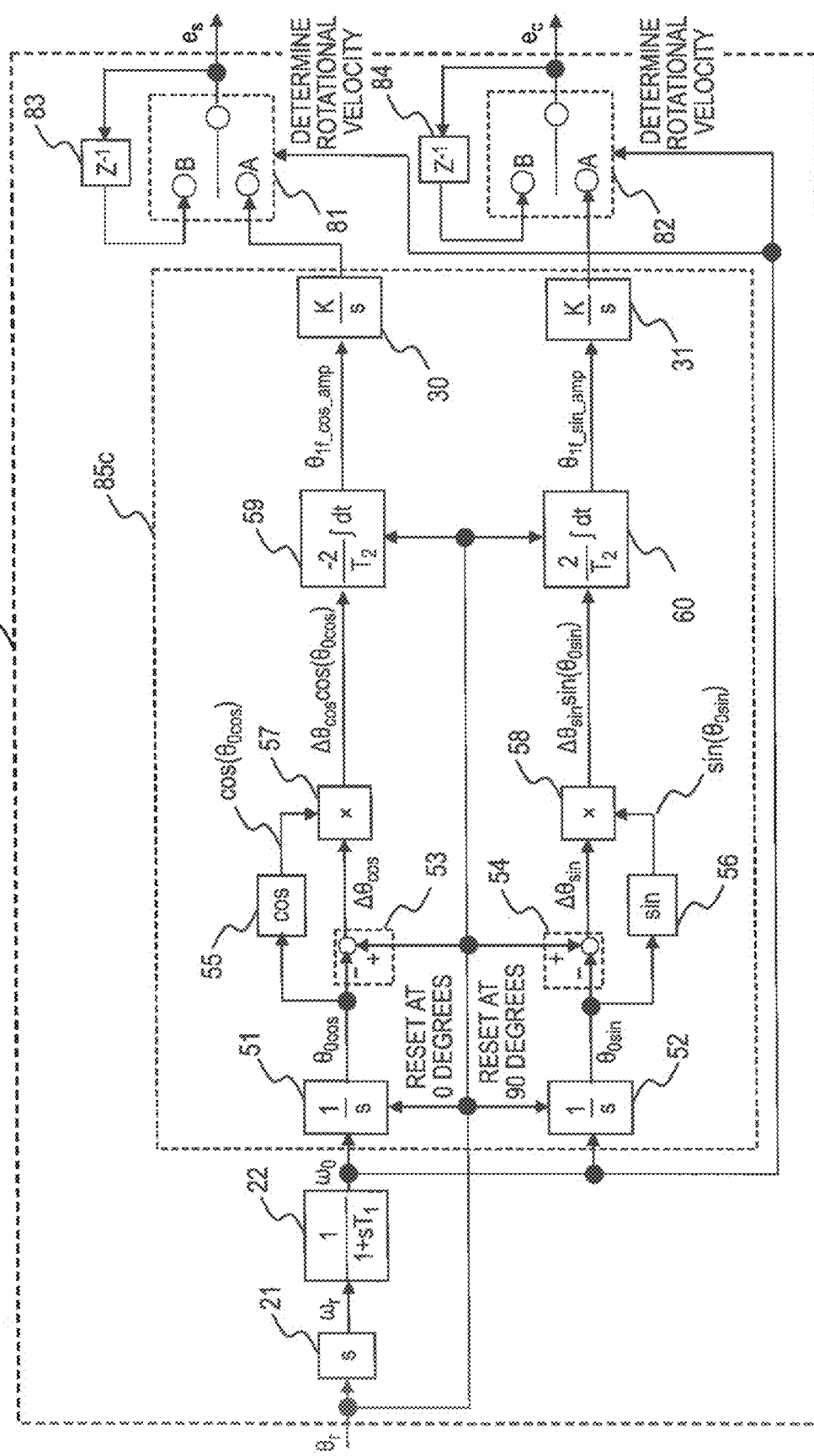
FIG. 14 is a block diagram showing the internal configuration of an offset correction value computing means in a fifth preferred embodiment.

In view of this, the fifth preferred embodiment sets the computation in the first through fourth preferred embodiments so that the velocity of the rotary machine becomes equal to or higher than a predetermined value. This makes it possible to remove the influence of the above-described interference. FIG. 14 is a block diagram showing the internal configuration of the offset correction value computing means 11d in the fifth preferred embodiment, in which similar or corresponding parts to the first through fourth preferred embodiments are denoted by the same reference symbols. In the fifth preferred embodiment, the computation of FIG. 10 in the fourth preferred embodiment is configured so that the computation of the offset correction value computing unit 85c is performed if the velocity signal $\omega_0$ is equal to or higher than a predetermined reference velocity $\omega$. In addition, switches 81 and 02 are provided downstream of the integrators 30 and 31.

Each of the switches 81 and 82 has two inputs A and B. Each of the switches outputs the input A in the case where it is determined that the velocity signal $\omega_0$ is higher than a predetermined reference velocity $\omega$, and outputs the input B in other cases. A reference character z in delay units 83 and 84 indicates an operator representing z transform, and each of the delay units 83 and 84 outputs, as the output signal, an input signal to the offset correction value computing means 11 that has been input one operation cycle earlier. Thus, the switch 81 outputs the input A, which is the output of the integrator 30 in the case where it is determined that the velocity signal $\omega_0$ is higher than the predetermined reference velocity $\omega$, and in other cases, it outputs the input B, which is the sine signal offset correction value $e_s$ at one operation cycle earlier. Thus, the switch 81 updates the output signal when the velocity signal $\omega_0$ is higher than the reference velocity co.

Likewise, the switch 82 outputs the input A, which is the output of the integrator 31 in the case where it is determined that the velocity signal $\omega_0$ is higher than the predetermined reference velocity co, and in other cases, it outputs the input B, which is the cosine signal offset correction value $e_c$ at one operation cycle earlier. Thus, the switch 82 updates the output signal when the velocity signal $\omega_0$ is higher than the reference velocity $\omega$.

Referring to FIG. 14, an offset correction value computing unit 85c outputs the sine signal offset correction value $e_s$ and the cosine signal offset correction value $e_c$ based on the input angle signal θr and the input velocity signal $\omega_0$. The offset correction value computing unit 85c used here is the same offset correction value computing unit 85c in the fourth preferred embodiment as shown in FIG. 10, but it is possible to use any one of the offset correction value computing units 85, 85a, and 85b described in the first through third preferred embodiments in place of the offset correction value computing unit 85c.

As described above, it is possible to eliminate the errors in the offset correction values resulting from the interference by the frequency of the 1f angle error and the frequency of velocity variation of the rotary machine by, performing the computation of the offset correction values when the velocity signal $\omega_0$ is higher than the reference velocity $\omega$. In particular, when the rotary machine is a motor for electric power steering, the correction of the 1f angle error can be performed effectively by setting the reference velocity $\omega$ to a velocity that is higher than the steering operation frequency of the driver. In addition, as the velocity of the rotary machine increases, the number of times of the computation per one rotation of the rotary machine decreases, and therefore, the offset correction accuracy lowers. In view of this, each of the switches 81 and 82 may be allowed to output the input A in the case where it is determined that the velocity signal is lower than a predetermined reference velocity and to output the input B in other cases. Thereby, it is also possible to set the computation of the offset correction values to be performed when the velocity of the rotary machine is equal to or less than a predetermined value.

Needless to say, this invention can be implemented accurately by reducing the errors in the inverter output voltage in the case where a torque ripple of the rotary machine or the rotary machine is driven by a power converter such as an inverter and the ripple components in angle detection resulting from the torque ripple due to the errors in electric current detection with the use of a filter or the like.

Furthermore, although the description has been made about the resolver with a two-phase output in the first through fifth preferred embodiments, this invention is not limited thereto, and the same advantageous effects can be obtained also in the cases where the invention is applied to a resolver with a three or more phase output.

In addition, although the description has been made about the cases where the invention is applied to a resolver with a two-phase output and a resolver with a three or more phase output in the first through fifth preferred embodiments, this invention is not limited thereto. The same advantageous effects can be obtained also in the cases where the invention is applied to an angle detector with a two-phase output or with a three or more phase output, including sensors utilizing magneto resistive (MR), such as a sensor utilizing anisotropic may (AMR), a sensor utilizing giant magnetoresistive (GMR), and a sensor utilizing tunneling magnetoresistive (TMR), an encoder, and a Hall element.

The present invention may be within the scope of the invention, or any combination of the embodiments, as appropriate, modified to respective embodiments, will be omitted.

Various modifications and alterations of this invention will be apparent to those skilled in the art without departing from the scope and spirit of this invention, and it should be understood that this invention is not limited to the illustrative embodiments set forth herein.

The invention claimed is:

1. An angle detecting apparatus for computing an angle signal θr of a rotary machine, the angle detecting apparatus including:
a resolver comprising a sine detection coil that obtains a sine signal and a cosine detection coil that obtains a cosine signal;
an angle calculator that obtains the angle signal Or indicating a rotational angle of the rotary machine, from the sine signal and the cosine signal, at an initial stage;
an offset correction value computing apparatus comprising:
a differentiator which obtains the angle signal θr from the angle calculator, and performs a differentiation operation on the angle signal θr to obtain a velocity signal $\omega_r$ from the angle signal θr;
a low-pass filter which performs a low pass filtering on the velocity signal $\omega_r$ to remove a frequency component higher than an electrical angle frequency of the angle signal θr and obtains a velocity signal $\omega_0$;
a first integrator which integrates the velocity signal $\omega_0$ to obtain a filtered angle signal $\theta_0$, in which the filtered angle signal $\theta_0$ is reset to the angle signal θr in response to the angle signal θr passing a predetermined angle α;
a subtracter which subtracts the filtered angle signal $\theta_0$ from the angle signal θr to obtain an angle error Δθ;
a second integrator which integrates a value based on an inverted value −Δθ of the angle error Δθ and determines a sine offset correction value $e_s$; and
a third integrator which integrates a value based on the angle error Δθ and determines a cosine offset correction value $e_c$;
a first adder that calculates a sum of the sine signal and the sine offset correction value $e_s$; and
a second adder that calculates a sum of the cosine signal and the cosine offset correction value $e_c$,
wherein the angle calculator adjusts the angle signal θr at subsequent stages, based on the sum of the sine signal and the sine offset correction value $e_s$, and the sum of the cosine signal and the cosine offset correction value $e_c$, and
wherein the rotary machine is controlled based on the adjusted angle signal θr.

2. The angle detecting apparatus according to claim 1, wherein the second integrator which determines the sine offset correction value $e_s$ is further configured to integrate a cosine component of the inverted value −Δθ of the angle error Δθ and the third integrator which determines the cosine offset correction value $e_c$ is further configured to integrate a sine component of the angle error Δθ.

3. The angle detecting apparatus according to claim 2, wherein the second integrator which determines the sine offset correction value $e_s$ is further configured to integrate the cosine component of the inverted value −Δθ of the angle error Δθ during a rotary machine mechanical angle cycle to obtain the sine offset correction value $e_s$ and the third integrator which determines the cosine offset correction value $e_c$ is further configured to integrate the sine component of the angle error Δθ during the rotary machine mechanical angle cycle to obtain the cosine offset correction value $e_c$.

4. The angle detecting apparatus according to claim 3, wherein the sine component contained in the angle signal θr is obtained from a location at which the angle signal θr has passed 90 degrees or 270 degrees, and the cosine component contained in the angle signal θr is obtained from a location at which the angle signal θr has passed 0 degrees or 180 degrees.

5. The angle detecting apparatus according to claim 1, wherein the angle detecting apparatus is further configured to compute the sine and the cosine offset correction values $e_s$ and $e_c$ in response to a velocity of the rotary machine being greater than or equal to a predetermined value.

6. The angle detecting apparatus according to claim 1, wherein the resolver uses magnetic reluctance.

7. The angle detecting apparatus according to claim 1, wherein the resolver includes an encoder.

8. The angle detecting apparatus according to claim 1, wherein the resolver includes a Hall element.

9. An angle detecting apparatus for computing an angle signal θr of a rotary machine, the angle detecting apparatus including:
a resolver comprising a sine detection coil that obtains a sine signal and a cosine detection coil that obtains a cosine signal;
an angle calculator that obtains the angle signal Or indicating a rotational angle of the rotary machine, from the sine signal and the cosine signal, at an initial stage;
an offset correction value computing apparatus comprising:
a differentiator which obtains the angle signal θr from the angle calculator, and performs a differentiation operation on the angle signal θr to obtain a velocity signal $\omega_r$ from the angle signal θr;
a low-pass filter which performs a low pass filtering on the velocity signal $\omega_r$ to remove a frequency component higher than an electrical angle frequency of the angle signal θr and obtains a velocity signal $\omega_0$;
a first integrator which integrates the velocity signal $\omega_0$ to obtain a filtered angle signal $\theta_0$, in which the filtered angle signal $\theta_0$ is reset to the angle signal θr in response to the angle signal θr passing a predetermined angle α;

a subtracter which subtracts the filtered angle signal $\theta_0$ from the angle signal $\theta r$ and obtains an angle error $D_q$;

a second integrator which integrates a cosine component of an inverted value $-Dq$ of the angle error $Dq$ and determines a sine offset correction value $e_s$ which represents a direct current value for the analog sine signal;

a third integrator which integrates a sine component of the angle error $Dq$ and determines a cosine offset correction value $e_c$ which represents a direct current value for the analog cosine signal;

a first adder that calculates a sum of the sine signal and the offset correction value $e_s$; and a second adder that calculates a sum of the cosine signal and the cosine offset correction value $e_c$, wherein the angle calculator adjusts the angle signal $\theta r$ at subsequent stages, based on the sum of the sine signal and the sine offset correction value $e_s$, and the sum of the cosine signal and the cosine offset correction value $e_c$, and wherein the rotatory machine is controlled based on the adjusted angle signal $\theta r$.

10. The angle detecting apparatus according to claim 9, wherein the sine and the cosine offset correction values $e_s$ and $e_c$ are computed based on the angle signal $\theta r$ with a period of an integer multiple of a rotary machine mechanical angle cycle.

11. The angle detecting apparatus according to claim 10, wherein the sine component contained in the angle signal $\theta r$ is obtained from a location at which the angle signal $\theta r$ has passed 90 degrees or 270 degrees, and the cosine component contained in the angle signal $\theta r$ is obtained from a location at which the angle signal $\theta r$ has passed 0 degrees or 180 degrees.

12. The angle detecting apparatus according to claim 9, wherein the angle detecting apparatus is further configured to compute the sine and the cosine offset correction values $e_s$ and $e_c$ in response to a velocity of the rotary machine being greater than or equal to a predetermined value.

13. The angle detecting apparatus according to claim 9, wherein the resolver uses magnetic reluctance.

14. The angle detecting apparatus according to claim 9, wherein the resolver includes an encoder.

15. The angle detecting apparatus according to claim 9, wherein the resolver includes a Hall element.

* * * * *